(12) United States Patent
Ueyama

(10) Patent No.: US 7,907,415 B2
(45) Date of Patent: Mar. 15, 2011

(54) HINGE MECHANISM OF FOLDABLE DEVICE, AND FOLDABLE DEVICE PROVIDED WITH HINGE MECHANISM

(75) Inventor: Tomoki Ueyama, Tottori (JP)

(73) Assignees: Sanyo Electric Co., Ltd., Moriguchi-shi (JP); Tottori Sanyo Electric Co., Ltd., Tottori-shi (JP)

( * ) Notice: Subject to any disclaimer, the term of this patent is extended or adjusted under 35 U.S.C. 154(b) by 472 days.

(21) Appl. No.: 11/997,083

(22) PCT Filed: Jul. 28, 2006

(86) PCT No.: PCT/JP2006/315044
§ 371 (c)(1),
(2), (4) Date: Jan. 28, 2008

(87) PCT Pub. No.: WO2007/013620
PCT Pub. Date: Feb. 1, 2007

(65) Prior Publication Data
US 2010/0149764 A1    Jun. 17, 2010

(30) Foreign Application Priority Data

Jul. 28, 2005  (JP) ................................. 2005-219435
Jul. 28, 2005  (JP) ................................. 2005-219436
Aug. 2, 2005   (JP) ................................. 2005-224091

(51) Int. Cl.
*H05K 1/00* (2006.01)
(52) U.S. Cl. ...................... 361/749; 361/755; 455/575.1; 455/575.3
(58) Field of Classification Search .................. 361/749, 361/683, 755; 455/575.1, 575.3, 90.3; 439/31; 16/354, 221
See application file for complete search history.

(56) References Cited

U.S. PATENT DOCUMENTS
2,206,739 A    7/1940   Brogren et al.
(Continued)

FOREIGN PATENT DOCUMENTS
EP    1614913 A1    1/2006
(Continued)

OTHER PUBLICATIONS

International Search Report of PCT/JP2006/315044, date of mailing Oct. 10, 2006.
(Continued)

*Primary Examiner* — Hung S Bui
(74) *Attorney, Agent, or Firm* — Westerman, Hattori, Daniels & Adrian, LLP

(57) ABSTRACT

A hinge mechanism (20) of a foldable device (1) for foldably connecting one end parts of a pair of device cases to each other, comprises a first frame (21) having first and second arm pieces (22, 24), a second frame (41) having third and fourth arm pieces (42, 44), and a third frame (30) having first and second connection pieces (32, 33) with first to fourth joining parts (34) to (37). The first to fourth arm pieces are rotatably connected to the first to fourth joining parts to form first to fourth connection parts (101) to (104), and drive mechanisms (50) and link mechanisms are formed in the first to fourth connection parts. When the first frame is rotated in one direction relative to the third frame, the second frame is rotated by the same angle as the rotated angle of the first frame in the opposite direction of the third frame. Thus, the hinge mechanism of the foldable device can stably fold the device cases without producing a displacement between both housings thereof when the device cases are folded by providing different axes in the device cases. Furthermore, a foldable device having the hinge mechanism can be provided.

28 Claims, 18 Drawing Sheets

U.S. PATENT DOCUMENTS

| | | | |
|---|---|---|---|
| 4,765,027 A | 8/1988 | Andric | |
| 5,102,084 A | 4/1992 | Park | |
| 5,666,694 A | 9/1997 | Slow et al. | |
| 5,867,872 A | 2/1999 | Katoh | |
| 5,987,704 A * | 11/1999 | Tang | 16/354 |
| 6,108,868 A * | 8/2000 | Lin | 16/340 |
| 6,519,812 B2 | 2/2003 | Ko et al. | |
| 6,925,684 B2 | 8/2005 | Kang et al. | |
| 6,926,546 B2 | 8/2005 | Kurokawa | |
| 6,963,766 B2 | 11/2005 | Jung | |
| 7,251,512 B2 | 7/2007 | Komiyama | |
| 7,272,423 B2 | 9/2007 | Satoh et al. | |
| 7,426,406 B2 * | 9/2008 | Maatta et al. | 455/575.8 |
| 7,483,723 B2 * | 1/2009 | Soderlund | 455/575.1 |
| 2004/0212956 A1 | 10/2004 | Kuivas et al. | |
| 2005/0155182 A1 | 7/2005 | Han et al. | |
| 2005/0239519 A1 | 10/2005 | Saitou et al. | |
| 2006/0236505 A1 * | 10/2006 | Maatta et al. | 16/366 |
| 2006/0238968 A1 | 10/2006 | Maatta et al. | |
| 2006/0238970 A1 | 10/2006 | Ukonaho et al. | |
| 2006/0279942 A1 | 12/2006 | Yasuda | |
| 2007/0226955 A1 | 10/2007 | Cho et al. | |
| 2008/0307608 A1 * | 12/2008 | Goto | 16/366 |
| 2009/0000062 A1 | 1/2009 | Yamanami | |
| 2009/0013500 A1 | 1/2009 | Ueyama et al. | |
| 2010/0071155 A1 * | 3/2010 | Ueyama et al. | 16/250 |

FOREIGN PATENT DOCUMENTS

| | | | |
|---|---|---|---|
| JP | 55-36551 A | 3/1980 | |
| JP | 3111241 U | 11/1991 | |
| JP | 9-130058 A | 5/1997 | |
| JP | 2001-234920 A | 8/2001 | |
| JP | 2001-251396 A | 9/2001 | |
| JP | 3083003 U | 10/2001 | |
| JP | 2002-276643 A | 9/2002 | |
| JP | 2004-47968 A | 2/2004 | |
| JP | 2004-84756 A | 3/2004 | |
| JP | 2004-308710 A | 11/2004 | |
| JP | 2004-316382 A | 11/2004 | |
| JP | 2005-6091 A | 1/2005 | |
| JP | 2005-19629 A | 1/2005 | |
| JP | 2005-76666 A | 3/2005 | |
| JP | 2005-155750 A | 6/2005 | |
| JP | 2006-234160 A | 9/2006 | |
| WO | 2004-090355 A1 | 10/2004 | |
| WO | 2006-080308 A1 | 8/2006 | |
| WO | 2007-086281 A1 | 8/2007 | |

OTHER PUBLICATIONS

Notification of Transmittal of Translation of the International Preliminary Report on Patentability (Form PCT/IB/338) of International Application No. PCT/JP2006/315044 mailed Feb. 7, 2008 with Forms PCT/IB/373 and English translation form PCT/ISA/237.

International Search Report of PCT/JP2006/315149, date of mailing Oct. 10, 2006.

Notification of Transmittal of Translation of the International Preliminary Report on Patentability (Form PCT/IB/338) of International Application No. PCT/JP2006/315149 mailed Feb. 14, 2008 with Forms PCT/IB/373 and PCT/ISA/237) (English translation).

U.S. Office Action dated Aug. 18, 2010, issued in U.S. Appl. No. 11/997,472.

* cited by examiner

FIG. 12A
FIG. 12B
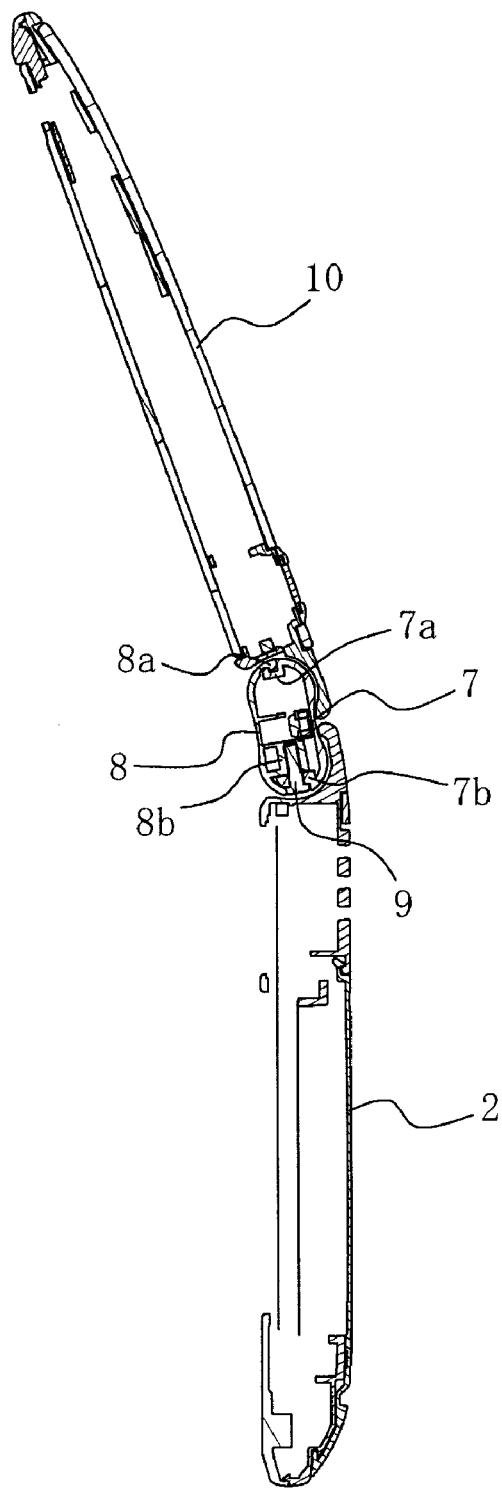
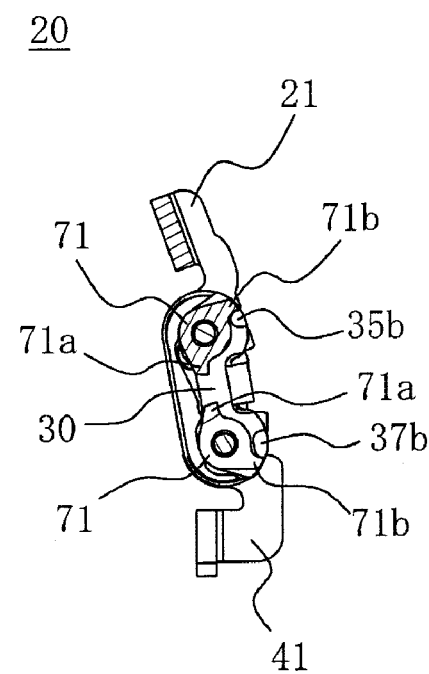

HINGE MECHANISM OF FOLDABLE DEVICE, AND FOLDABLE DEVICE PROVIDED WITH HINGE MECHANISM

TECHNICAL FIELD

The present invention relates to a hinge mechanism of a foldable device, and to a foldable device that is provided with the hinge mechanism, and particularly relates to an improvement of a hinge mechanism for foldably connecting the device cases of a mobile telephone, a notebook personal computer, an electronic dictionary, or the like.

BACKGROUND ART

The use of mobile telephones, notebook personal computers, electronic dictionaries, and other electronic information devices has recently become widespread. In terms of software, various types of software have been developed and installed in these electronic information devices to increase performance, and in terms of hardware, progress has been made in reduced size, reduced weight, and design implementation. Hardware size reduction, weight reduction, and design implementation have been developed the most in mobile telephones in particular, and various types of mobile telephones have been proposed (see Patent References 1 and 2 below, for example).

FIG. 16 shows the folding mobile telephone described in Patent Reference 1, wherein FIG. 16A is a perspective view, and FIG. 16B is a partially enlarged perspective view showing the hinge mechanism.

The folding mobile telephone 80 is composed of a cover body case 82 provided with a display part 81, a speaker, or the like; a main body case 84 provided with a wireless transceiver circuit and various types of operating keys 83, a microphone, or the like; and hinge mechanisms 85, 85'; and has a structure in which the cover body case 82 and the main body case 84 are connected to each other by the hinge mechanisms 85, 85' so as to be able to fold together.

The hinge mechanisms 85, 85' are composed of the hinge mechanism 85 shown in the right side of FIG. 16A, and the hinge mechanism 85' shown on the left side of FIG. 16A. Among these hinge mechanisms, a first bridge part 84a that protrudes from the right-side hinge mechanism 85, and a first bridge part 82a that protrudes from the cover body case 82 are disposed on the same axis in the main body case 84, and a hinge assembly 86 is fitted into the center holes of the first bridge parts 84a, 82a. In the left-side hinge mechanism 85', a second bridge part 84b that protrudes from the main body case 84, and a second bridge part 82b that protrudes from the cover case 82 are disposed on the same axis, and a hinge shaft 87 is fitted into the center holes of the bridge parts 84b, 82b. As shown in FIG. 16B, the hinge assembly 86 fitted into the center holes of the first bridge parts 84a, 82a is composed of a main body drive unit 88 that rotates integrally with the main body case, and is connected to an end part of the main body case 84; a cover body drive unit 89 that rotates integrally with the cover body case, and is connected to an end part of the cover body case 82; a motive mechanism (not shown) disposed between the main body drive unit 88 and the cover body drive unit 89, for exerting a force for rotating the cover body drive unit 89 in the opening direction of the cover body case 82; and a maintaining mechanism for maintaining the cover body case 82 in the closed position when the cover body case 82 is in the closed state.

Through the use of such a hinge mechanism, the cover body case 82 can be smoothly opened and closed in folding fashion with respect to the main body case 84 in the folding mobile telephone of Patent Reference 1.

FIGS. 17 and 18 show the folding mobile telephone described in Patent Reference 2, wherein FIG. 17 is an exploded perspective view showing the mobile telephone, FIG. 18A is a side view showing a state in which the mobile telephone case is folded together, FIG. 18B is an enlarged sectional view showing the portion to which the hinge mechanism of the mobile telephone is provided, and FIG. 18C is a partial enlarged sectional view along line X-X in FIG. 18B.

The folding mobile telephone 90 is provided with a transmitter case 91 composed of a pair of housings 91A, 91B; a connecting member 92 connected so as to be capable of rotating about a first rotational axis L1 to a housing part 91C that is formed at one end part of the transmitter case 91; a receiver case 94 composed of a pair of housings 94A, 94B and connected to a housing part 94C formed at one end thereof, so as to be capable of rotating about a second rotational axis L2 that is parallel to the first rotational axis L1 of the connecting member 92; wherein the transmitter case 91 and the receiver case 94 are connected to each other by the connecting member 92, and can rotate at the same angle as each other in opposite directions.

The transmitter and receiver cases 91, 94 are in thin rectangular shapes, accommodating concave parts are formed at both end parts in the longitudinal direction of the housing parts 91C, 94C, pairs of housing concave parts are provided on the extension lines of the first rotational axis L1 and the second rotational axis L2 at both end parts in the longitudinal direction of the connecting member 92, and a pair of first hinges 95A, 95A and a pair of second hinges 95B, 95B are accommodated in the accommodating concave parts. The first hinges 95A, 95A are disposed in the housing concave parts of the connecting member 92 and the transmitter case 91, and the second hinges 95B, 95B are disposed in the housing concave parts of the connecting member 92 and the receiver case 94, whereby the connecting member 92 and the transmitter case 91 are connected so as to be capable of rotating, and the connecting member 92 and the receiver case 94 are connected so as to be capable of rotating.

The connecting member 92 rotates from the folded position to the final opened position with respect to the transmitter case 91. At this time, in the folded position, the connecting member is restricted by coming in contact with a first contacting surface 97 composed of a wall surface that extends in the minor axis direction of the transmitter case 91 among the wall surfaces that partition the housing part 91C. In the opened position, the connecting member 92 is restricted by coming in contact with a second contacting surface 98 formed on the end positioned on the external edge part in the minor axis direction of the housing part 91C.

According to this configuration, since a fixed rotational sequence is always maintained for the rotation of the connecting member with respect to one case of the transmitter and receiver cases, and for the rotation of the other case with respect to the connecting member, folding and opening can be performed smoothly without imparting discomfort to the user.

[Patent Reference 1]: Japanese Laid-open Patent Application No. 2001-251396 (FIGS. 2 and 6, paragraphs [0016] through [0021])

[Patent Reference 2]: Japanese Laid-open Patent Application No. 2004-308710 (FIGS. 2 through 6, paragraphs [0010] through [0015])

DISCLOSURE OF THE INVENTION

[Problems the Invention Is Intended To Solve]

In the folding mobile telephone described in Patent References 1 and 2, since the cover body case (receiver case) and the main body case (transmitter case) are connected by a hinge mechanism that allows both cases to fold together, folding and opening of the cover body case and the main body case can be performed smoothly.

However, in the folding mobile telephone disclosed in Patent Reference 1, the hinge assembly having a drive member is accommodated inside the first bridge part, and the size of the outline of the first bridge part therefore increases, and the outline of the other second bridge part also increases in size in conjunction with the outline of the first bridge part. A cylindrical protrusion is therefore formed by the connecting part of this mobile telephone in the open state. When such a protrusion is present in the connecting part, the user is made conscious of the presence of this protrusion and is given an image of a conspicuous machine part having inferior design properties, and the usable surface area of the cover body case and the main body case is also reduced by the presence of the protrusion. Since the operating keys in the main body case are disposed near the connecting parts, i.e., the cylindrical protrusion, the operating area of the operating keys is reduced by the presence of such a protrusion, and the number of provided operating keys is limited. Operation can also be hindered by the fingertips striking the protrusion during operation.

Since two rotational axes are provided in the mobile telephone disclosed in Patent Reference 2, no protrusion is formed in the connecting part of the transmitter and receiver cases, and the surface in the open state is therefore flat. The transmitter and receiver cases and the connecting member are also connected by pairs of first and second hinges on the first and second rotational axes L1, L2, respectively, but the hinge members are each rotated independently of each other.

In mobile telephones and the like, both cases are generally formed so as to neatly overlap and have substantially the same dimensions when the transmitter and receiver cases are folded together. However, in the configuration disclosed in Patent Reference 2, when the first and second hinges are separately rotated with respect to the connecting member, the cases may slide when the transmitter and receiver cases are folded together, and when both cases have the same shape, a neat overlap is not obtained when the cases are folded together, and displacement occurs in which one case overhangs on the other case.

Consequently, when such displacement occurs, the user may even be led to conclude that the unit is defective. In order to correct this displacement, the user must slide the cases into the overlapping state, and the user is thus forced to perform an additional operation.

Furthermore, since the first and second hinges operate independently, the first hinge or the second hinge collides with a wall surface or the like, and the timing at which the subsequent rotation is prevented differs between the first hinge and the second hinge. Therefore, the opening and closing operation is not always constant, and when one of the hinges collides with the wall surface during opening and closing, and rotation is prevented, the user experiences discomfort, and smooth opening and closing is impossible to perform. The transmitter and receiver cases and the connecting member are also formed from a resin, and in the open state of the transmitter and receiver cases, since both cases are supported by contact with the connecting member and the case end parts made of resin, the mechanical strength is low, and there is a risk of breakage of the resin cases or the like when a strong force is applied to one of the cases.

Furthermore, in the folding mobile telephones described in Patent References 1 and 2, since the transmitter and receiver cases and the member constituting the hinge mechanism are adjacent to each other, the hinge member and the transmitter and receiver cases rub against each other during opening and closing of the transmitter and receiver cases, and this rubbing can create a sound, e.g., a creaking sound, that is unpleasant to the user. Such a sound can be eliminated by loosening the connections between the hinge mechanism and the transmitter and receiver cases, but play then develops between the cases and the hinge mechanism, and folding of the transmitter and receiver cases becomes unstable.

Furthermore, in the folding mobile telephone described in Patent Reference 2, the rotation distance of the mobile telephone in the open state or the closed state is restricted by causing the upper and lower housings of the mobile telephone to come in contact with each other. However, since the housings themselves are generally covered by cases made of resin, when excessive stress is applied in the open direction, there is a risk of the cases breaking through contact with each other, and the cases may rub together and create a creaking sound. Since the mobile telephone is maintained in the open state or the closed state merely by the housings making contact with each other, the open state or the closed state essentially cannot be maintained, and the open state or the closed state is easily removed merely by applying a small force in the rotation direction.

In the folding mobile telephone described in Patent Reference 1, a flexible printed wiring board (FPC; Flexible Printed Circuit; hereinafter referred to simply as FPC) or other connection wiring is connected for transmitting various signals and electrically connecting the control circuit boards in both cases to each other between the main body case and the cover body case.

However, since hinge mechanisms 85, 85' provided on the left and right are disposed on the same axis in the folding mobile telephone disclosed in Patent Reference 1, when an FPC is wired inside such a hinge mechanism, the FPC is flexed or pulled during opening and closing of the cases, and tearing of the FPC can therefore occur, and there is a risk breakage of the FPC when relatively high tension is applied. Such a load is concentrated particularly at the portion positioned over the hinge mechanism.

The present invention was developed in order to overcome such various drawbacks of the conventional technique, and an object of the present invention is to provide a hinge mechanism of a foldable device having a different rotational axis in each apparatus case, and that enables a stable folding action in which the housings do not become misaligned during folding of the device cases, and to provide a foldable device that is provided with the hinge apparatus.

Another object of the present invention is to provide a hinge mechanism of a foldable device in which the foldable device can be securely maintained in the open state or the closed state, the strength of the pair of device cases of the foldable device is enhanced, and the device cases are prevented from rubbing together and creating a creaking sound. An object of the present invention is also to provide a foldable device that is provided with the hinge mechanism.

Another object of the present invention is to provide a foldable device in which stress that occurs in the connecting wiring for electrically connecting the device cases is dispersed to make breakage unlikely.

[Means for Solving the Abovementioned Problems]

In order to achieve the abovementioned objects, the hinge mechanism of a foldable device according to the present invention is a hinge mechanism of a foldable device for foldably connecting end parts on one side of a pair of device cases to each other; and the hinge mechanism of a foldable device characterized in that the hinge mechanism comprises a first frame provided with a joining piece composed of a plate-shaped body having a prescribed length that is attached to one of the device cases, and first and second arm pieces that stand in the same direction from both end parts of the joining piece, and in which joining parts are formed at distal end parts of the first and second arm pieces; a second frame provided with a joining piece composed of a plate-shaped body having a prescribed length that is attached to another of the device cases, and third and fourth arm pieces that stand in the same direction from both end parts of the joining piece, and in which joining parts are formed at distal end parts of the third and fourth arm pieces; and a third frame provided with a joining piece composed of a plate-shaped body having a prescribed length, and first and second connecting pieces that stand in the same direction from both end parts of the joining piece, and are branched to the left and right, and that have first through fourth joining parts connected to the first through fourth arm pieces at the branched distal end parts; wherein the joining parts formed in the first through fourth arm pieces, and the first through fourth joining parts are pivotally connected; first through fourth connecting parts are formed, and a drive mechanism for rotating/retaining the first and second frames in a prescribed position is provided to at least one of the first through fourth connecting parts; and a connection is formed by a linking mechanism between at least one combination of connecting parts of the first or second connecting part and the third or fourth connecting part, and when the first frame is rotated a prescribed angle in one direction in relation to the third frame about the first and second connecting parts as an axis, the linking mechanism links the rotation so that the second frame rotates the same angle as the first frame in the opposite direction with respect to the third frame about the third and fourth connecting parts as an axis.

The abovementioned hinge mechanism of a foldable device is also characterized in that the drive mechanism is provided to the first connection part and third connection part that are opposite each other, to the second connection part and fourth connection part that are opposite each other, or to all of the first through fourth connection parts.

The abovementioned hinge mechanism of a foldable device is also characterized in that a stopper mechanism for restricting the first and second frames in an open state and a closed state is provided to at least one of the first through fourth connection parts.

The abovementioned hinge mechanism of a foldable device is also characterized in that the stopper mechanism is provided to one of the first and second connection parts that connect the first frame, and to one of the third and fourth connection parts that connect the second frame.

The abovementioned hinge mechanism of a foldable device is also characterized in that the drive mechanism is provided to a connection part to which the stopper mechanism is not provided.

The abovementioned hinge mechanism of a foldable device is also the stopper mechanism comprises a stopper member that is a circular plate body having an external diameter smaller than an external diameter of the joining part, and that is fixed to one surface of a joining part of an arm piece or connecting piece that constitutes a connection part to which the stopper mechanism is provided, wherein the stopper member is provided with a pair of locking tabs that protrude in a normal line direction from two locations of an external peripheral edge of the plate body; and a locking protrusion for preventing rotation of the stopper member by coming in contact with any of the locking protrusions, provided to one surface of a joining part of the arm piece or connecting piece to which the stopper member is not fixed.

The abovementioned hinge mechanism of a foldable device is also characterized in that the drive mechanism comprises arm-piece-side cam pieces provided to one surface of at least one of the first through fourth arm pieces; connection-piece-side cam pieces provided to one surface that comes in contact with the arm-piece-side cam pieces of the connection piece connected to the arm piece to which the arm-piece-side cam pieces are provided; and a spring body for pushing the arm piece or connection piece to strengthen meshing of the arm-piece-side cam pieces with the connection-piece-side cam pieces.

The abovementioned hinge mechanism of a foldable device is also characterized in that the arm-piece-side cam pieces and connection-piece-side cam pieces are provided so that a plurality of protruding cams provided in radial fashion about a rotational axis mesh together, and so that an angle formed by any two of the plurality of cams is the same angle as an angle to which the first or second frame can rotate.

The abovementioned hinge mechanism of a foldable device is also characterized in that the arm-piece-side cam pieces or connection-piece-side cam pieces are integrally formed on one surface of the arm piece or connection piece.

The abovementioned hinge mechanism of a foldable device is also characterized in that the linking mechanism is provided between at least one pair of connection parts that face each other via the third frame among the first through fourth connection parts.

The abovementioned hinge mechanism of a foldable device is also characterized in that the stopper member is composed of a metal rigid body.

The abovementioned hinge mechanism of a foldable device is also characterized in that the first through third frames are composed of metal rigid bodies.

The abovementioned hinge mechanism of a foldable device is also characterized in that the linking mechanism is a link mechanism comprising an actuation bar in which a center part is pivotally fixed between the first or second connection part and the third or fourth connection part; and a pair of cam bridge pieces fixed to a rotation shaft of the first or second arm piece and the third or fourth arm piece, wherein one end part and the other end part of the actuation bar are fixed in a position at a prescribed distance from the rotation shaft.

The abovementioned hinge mechanism of a foldable device is also characterized in that the linking mechanism is a gear mechanism comprising gears fixed to each of the first or second arm piece and the third or fourth arm piece, and an even number of free gears attached between the gears.

The foldable device according to the present invention comprises a pair of device cases and characterized in that an end part on one side of each of the pair of device cases is connected to the other by the hinge mechanism according to any of claims 1 through 14.

The abovementioned foldable device is also characterized in that surfaces of the pair of device cases come in contact with each other, and a prescribed gap is formed between the locking protrusion and one of the locking tabs of the stopper member when the foldable device is placed in a dosed state; and end parts on one side that are connected by the hinge mechanism of the pair of device cases come in contact with each other, and a prescribed gap is formed between the locking protrusion and the other locking tab of the stopper member when the foldable device is placed in an open state.

The abovementioned foldable device is also characterized in that the prescribed gap is a gap that corresponds to 0.5 to 1.5° about a rotation axis of the stopper member.

The abovementioned foldable device is also characterized in that at least a control circuit board is provided inside the pair of device cases, both corners of an end part on one side to which the hinge mechanism of the pair of device cases is connected protrude a prescribed length in a direction orthogonal to the end part on one side, and the hinge mechanism is attached between the protruding corners of the pair of device cases; the foldable device is further provided with connection wiring for electrically connecting the pair of device cases with each other and transmitting various types of control signals and the like; and the connection wiring is wired in curving fashion along the hinge mechanism and corners of one of the pair of device cases, and both ends of the connection wiring are connected to the control circuit boards inside the pair of device cases.

The abovementioned foldable device is also characterized in that the hinge mechanism is composed of a first rotation shaft composed of the first and second connection parts that is positioned between the corners of one of the device cases, and a second rotation shaft composed of the third and fourth connection parts that is positioned between the corners of the other of the device cases; and the connection wiring is provided with first through fourth curves and passes from one of the device cases through one corner of the device case, leads toward the hinge mechanism along the first rotation shaft via the first curve, extends toward the second rotation shaft from the first rotation shaft via the second curve, leads toward one corner of the other of the device cases along the second rotation shaft via the third curve, and is wired to the other of the device cases via the fourth curve.

The abovementioned foldable device is also characterized in that the connection wiring is wired so as to pass through adjacent corners on one side among the corners of the pair of device cases The abovementioned foldable device is also characterized in that the connection wiring is a flexible printed wiring board.

The abovementioned foldable device is also characterized in that the flexible printed wiring board is composed of an elongated film-shaped body provided at both ends with terminal pieces that are connected to connecting parts provided to the control circuit boards, and a middle part in a longitudinal direction is curved in substantially a horseshoe shape.

The abovementioned foldable device is also characterized in that two areas extending in a direction orthogonal to a longitudinal direction of the flexible printed wiring board are wired along the first and second rotation shafts of the hinge mechanism.

The abovementioned foldable device is also characterized in that areas extending in a direction parallel to the longitudinal direction of the flexible printed wiring board are wound at a prescribed angle around the first and second rotation shafts in a position adjacent to the curves, which curve in a horseshoe shape.

The abovementioned foldable device is also characterized in that the curves that curve in a horseshoe shape are curved in an arc.

The abovementioned foldable device is also characterized in that a plurality of the flexible printed wiring boards is overlapped and wired.

The abovementioned foldable device is also characterized in that the connection wiring is a coaxial cable having a prescribed diameter.

The abovementioned foldable device is also characterized in that the coaxial cable is composed of a flexible cable-shaped body provided at both ends with terminal pieces that are connected to connecting parts provided to the control circuit boards, and the coaxial cable is wired so as to pass through communicating holes formed along an axis of the first and second rotation shafts.

[Effect Of The Invention]

Such excellent effects as those described below are obtained through the configuration of the present invention described above. Specifically, according to the hinge mechanism of a foldable device according to the present invention, two rotation shafts are present in the hinge mechanism, but the second frame rotates in the same manner in the opposite direction based on the third frame in conjunction with the rotation of the first frame in one direction based on the third frame, for example, and the device cases therefore rotate smoothly. The rotation of the first frame and the rotation of the second frame are coupled. Therefore, although misalignment in the positioning of the device cases occurred in the conventional technique when the two shafts were independent in the folded state of the foldable device, such misalignment does not occur in the present invention. Specifically, when the hinge mechanism is applied to a folding mobile telephone, for example, there is no misalignment of the upper and lower housings of the mobile telephone, and a sense of instability is not imparted to the user.

According to a preferred embodiment of the hinge mechanism of a foldable device, the drive mechanism is provided to a plurality of connection parts, whereby play and rattling due to backlash of the drive mechanism can be prevented.

According to a preferred embodiment of the hinge mechanism of a foldable device, a stopper mechanism for restricting the first and second frames in the open state and the closed state is provided to the hinge mechanism itself, whereby restriction of the open or closed state by contact between the device cases is unnecessary when the present invention is applied to a foldable device, and damage of the device cases of the foldable device can therefore be prevented.

According to a preferred embodiment of the hinge mechanism of a foldable device, a stopper mechanism is provided to each of two rotation shafts, whereby play or rattling no longer occurs in the rotation shafts relative to a case in which a stopper mechanism is provided to only one of the rotation shafts.

According to a preferred embodiment of the hinge mechanism of a foldable device, the drive mechanism is provided in a position in which the stopper mechanism is not provided, whereby the load that occurs in each of the first through fourth connection parts can be distributed. Since the drive mechanism and the stopper mechanism are not provided to a single connection part, the structure of each connection part may remain relatively simple, and the connection parts can therefore be manufactured with relative ease.

According to a preferred embodiment of the hinge mechanism of a foldable device, since the stopper mechanism is composed of a stopper member having a pair of locking tabs on the external peripheral edge, and a locking protrusion provided to an engaging part of the arm piece or connection piece, such effects as those described above can be obtained by a simple structure.

According to a preferred embodiment of the hinge mechanism of a foldable device, a simple structure is formed in which cam pieces provided to one surface of an arm piece are meshed with cam pieces provided to one surface of a connecting piece, and the urging of a spring body strengthens the meshed state. The hinge mechanism can thereby be satisfactorily driven, and a snap action can be obtained during driving.

According to a preferred embodiment of the hinge mechanism of a foldable device, when the angle formed by the cams is provided in accordance with the angle to which the first or second frame can rotate, since the cams are also meshed at the same time when rotation is restricted by the stopper member, the first and second frames can also be retained by the drive mechanism during the open state or the closed state, and the hinge mechanism and the foldable device provided with the hinge mechanism are therefore stabilized in the open state and the closed state. When more cams can be provided, e.g., when a cam can be provided at each half of the angle to which the first or second frame can rotate, for example, the drive mechanism meshes at exactly the midpoint of the open state and the closed state, and a more preferred snap action can be obtained.

According to a preferred embodiment of the hinge mechanism of a foldable device, cam pieces provided to a connecting piece are integrally formed by folding, press machining, or the like, for example, whereby the mechanical strength of the cam pieces can be markedly enhanced, and the service life of the hinge mechanism can be increased. When the cam pieces provided to the arm piece are fixed to a spring body, an excessive load does not occur in the arm piece during driving, and driving can be performed satisfactorily.

According to a preferred embodiment of the hinge mechanism of a foldable device, the linking mechanism is provided so as to connect the connection parts together that face each other via the third frame, and the amount of space occupied by the linking mechanism can thereby be minimized.

According to a preferred embodiment of the hinge mechanism of a foldable device, the stopper member is provided with rigidity, whereby the first and second frames can be securely supported, and damage and the like can be minimized.

According to a preferred embodiment of the hinge mechanism of a foldable device, the first through third frames are formed from metal rigid bodies, whereby the mechanical strength of the hinge mechanism can be maintained, the pair of device cases can be placed in an electrically conducting state via the frames, and the antenna performance is enhanced in the mobile telephone or other electronic device.

According to a preferred embodiment of the hinge mechanism of a foldable device, a link mechanism is employed as the linking mechanism, whereby a hinge mechanism of a foldable device can be provided that satisfactorily demonstrates the effects of the first aspect of the present invention described above.

According to a preferred embodiment of the hinge mechanism of a foldable device, a gear mechanism is employed as the linking mechanism, whereby a hinge mechanism of a foldable device can be provided that satisfactorily demonstrates the effects of the first aspect of the present invention described above.

According to the foldable device of the present invention, a foldable device can be provided that demonstrates the effects described above.

According to a preferred embodiment of the foldable device, a gap is formed between the locking protrusion and the locking tab of the stopper member, whereby the device cases come in contact with each other when in the open state and the closed state, but restriction by the stopper mechanism is not strictly applied, the cam pieces of the drive mechanism do not mesh together in this state, and a drive force thereby acts in the direction in which the cam pieces are caused to mesh together, i.e., the direction in which the device cases make contact with each other. Therefore, the device cases are pushed so as to press against each other, and the open state and the closed state can be securely maintained.

According to a preferred embodiment of the foldable device, the gap is set to an extremely small value of 0.5° to 1.5°, whereby the rotation is restricted by the stopper mechanism when the device cases are further pushed in the rotation direction in the open state and the closed state. As a result, the rotation of the device cases is controlled by the two stopper actions, and reliable rotation of the device cases can be obtained.

According to a preferred embodiment of the foldable device, the two-shaft mechanism described above is used as the hinge mechanism, connection wiring is wired along the hinge mechanism, and the device cases are connected to each other. Stress on the connection wiring due to the opening and closing of the device cases is thereby distributed to each shaft, and the stress does not concentrate in any one portion of the connection wiring. The connection wiring can therefore be prevented from breaking due to flexing or tension. Specifically, stress is not concentrated in locations of the connection wiring, and since there are two rotation shafts, a large amount of space is available for allowing flexing and the like that occurs during opening and closing in the area around the two shafts. Therefore, even when flexing does occur, the connection wiring is unlikely to be stressed or broken by the flexing.

According to a preferred embodiment of the foldable device, first through fourth curves are provided to the connection wiring, whereby the stress that occurs due to opening and closing of the device cases can be dispersed to the four curves, and breakage of the connection wiring can therefore be more effectively prevented.

According to a preferred embodiment of the foldable device, since the connection wiring is wired so as to communicate adjacent corners of the device cases with each other, the connection wiring can be made comparatively short.

According to a preferred embodiment of the foldable device, even when an FPC composed of a film is used as the connection wiring, breakage due to multiple openings and closings of the device cases can be satisfactorily prevented.

According to a preferred embodiment of the foldable device, two areas orthogonal in the longitudinal direction of the FPC are wired along the rotation shafts, whereby stress no longer occurs during rotation in the two areas.

According to a preferred embodiment of the foldable device, each curve is rotated a prescribed angle (e.g., 180°) about a rotation shaft, whereby the diameter of the rotating portion is increased/decreased during opening and closing, and stress is not directly applied to the FPC.

According to a preferred embodiment of the foldable device, the curves are made arcuate without angled parts, whereby stress is not concentrated at the angled parts, and breakage is therefore less likely.

According to a preferred embodiment of the foldable device, since two rotation shafts are present in the hinge mechanism, a large wiring space is available for the FPC. Therefore, when there is a need to use a large amount of wiring to connect the control boards of the device cases, the FPC is not easily stressed even when FPCs are stacked and wired, and the number of FPC sheets can therefore be easily changed according to the number of wiring units.

According to a preferred embodiment of the foldable device, even when a coaxial cable is used instead of an FPC for the connection wiring, the control boards of both device cases can be connected to each other without breakage occurring.

According to a preferred embodiment of the foldable device, the coaxial cable is composed of a flexible cable, and is curved and passed through along the two rotation shafts, whereby both control boards can be connected. In this case, since the coaxial cable is wired along the two rotation shafts, stress is distributed to each curved portion, and breakage and the like can therefore be satisfactorily prevented.

BRIEF DESCRIPTION OF THE DRAWINGS

FIG. 4 is a diagram showing the FPC, wherein

FIG. 10 is a diagram showing the relationship between the hinge mechanism and the folded state of the transmitter and receiver cases, wherein

FIG. 11 is a diagram showing a state in which the transmitter and receiver cases of FIG. 10 are opened to 80°, wherein

FIG. 12 is a diagram showing a state in which the transmitter and receiver cases of FIG. 10 are opened to 160°, wherein FIG. 12A is a side sectional view, and FIG. 12B is an enlarged side sectional view showing the hinge mechanism in the state shown in FIG. 12A;

FIG. 14 is a diagram showing the hinge mechanism according to Example 2 of the present invention, wherein

FIG. 16 is a diagram showing the conventional folding mobile telephone, wherein

FIG. 18 is a diagram showing the assembled state of the mobile telephone of FIG. 17, wherein

KEY TO SYMBOLS

Figure 1:
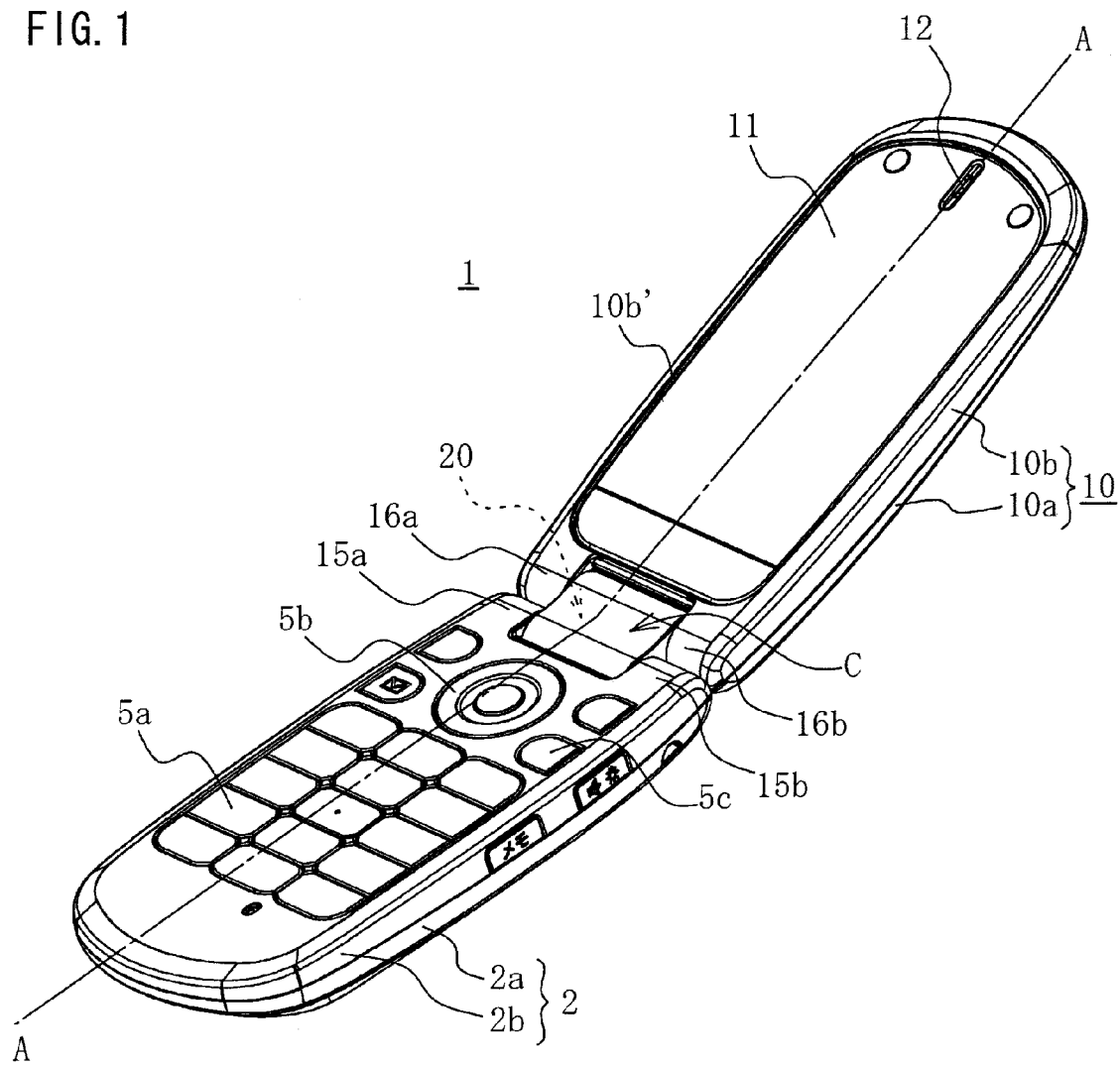
FIG. 1 is a perspective view showing the folding mobile telephone to which the hinge mechanism according to an example of the present invention is applied.

1 mobile telephone (foldable device)
2 transmitter case
6 FPC
6a, 6b terminal pieces
6c connecting piece
6$_1$, 6$_1$ first ring parts
6$_2$, 6$_2$ first connection parts
6$_3$, 6$_3$ second ring parts
6$_4$ second connection part
10 receiver case
20 hinge mechanism
21 first frame
22 first arm piece
24 second arm piece
26 joining piece
26a, 26b attachment holes
30 connecting member (third frame)
31 joining piece
32 first connecting piece
33 second connecting piece
34 first joining part
34b cam
35 second joining part
35b locking protrusion
36 third joining part
36b cam
37 fourth joining part
37b locking protrusion
41 second frame
42 third arm piece
44 fourth arm piece
46 joining piece
46a, 46b U-shaped groove
50 drive mechanism
51 cylindrical cap
54 spring body pushing part
55 cam plate
55b cam
60 link mechanism
61 actuation bar
63 restricting plate
65 cam bridge piece
65a protruding rod
67 actuation stick
70 stopper mechanism
71 stopper member
71a, 71b locking tabs
101 first connecting part
102 second connecting part
103 third connecting part 104 fourth connecting part
105, 118 first and second main shafts
106, 119 gears
107, 108 first and second pivots
111 rotation force transmission mechanism
112, 113 (free) gears
115 rotation angle restricting means
116 cam surface
117 cam follower
121 coupling
122 sleeve
123 extension spring
124 stop washer
125 auxiliary attachment frame

BEST MODE FOR CARRYING OUT THE INVENTION

Preferred embodiments of the present invention will be described hereinafter with reference to the drawings. However, the embodiments described below are merely examples of the hinge mechanism of a foldable device and the foldable device provided with the hinge mechanism given as specific examples of the technical concept of the present invention, and are not intended to limit the present invention to this hinge mechanism of a foldable device and foldable device provided with the hinge mechanism. The present invention can also be applied in equivalent fashion to embodiments other than those included in the claims. In the examples described hereinafter, the present invention is applied to a folding mobile telephone as the foldable device, but the present invention is not limited to such a mobile telephone, and may also be applied to notebook PCs, electronic dictionaries, and various other types of devices that are provided with a folding mechanism.

EXAMPLE 1

Figure 2:
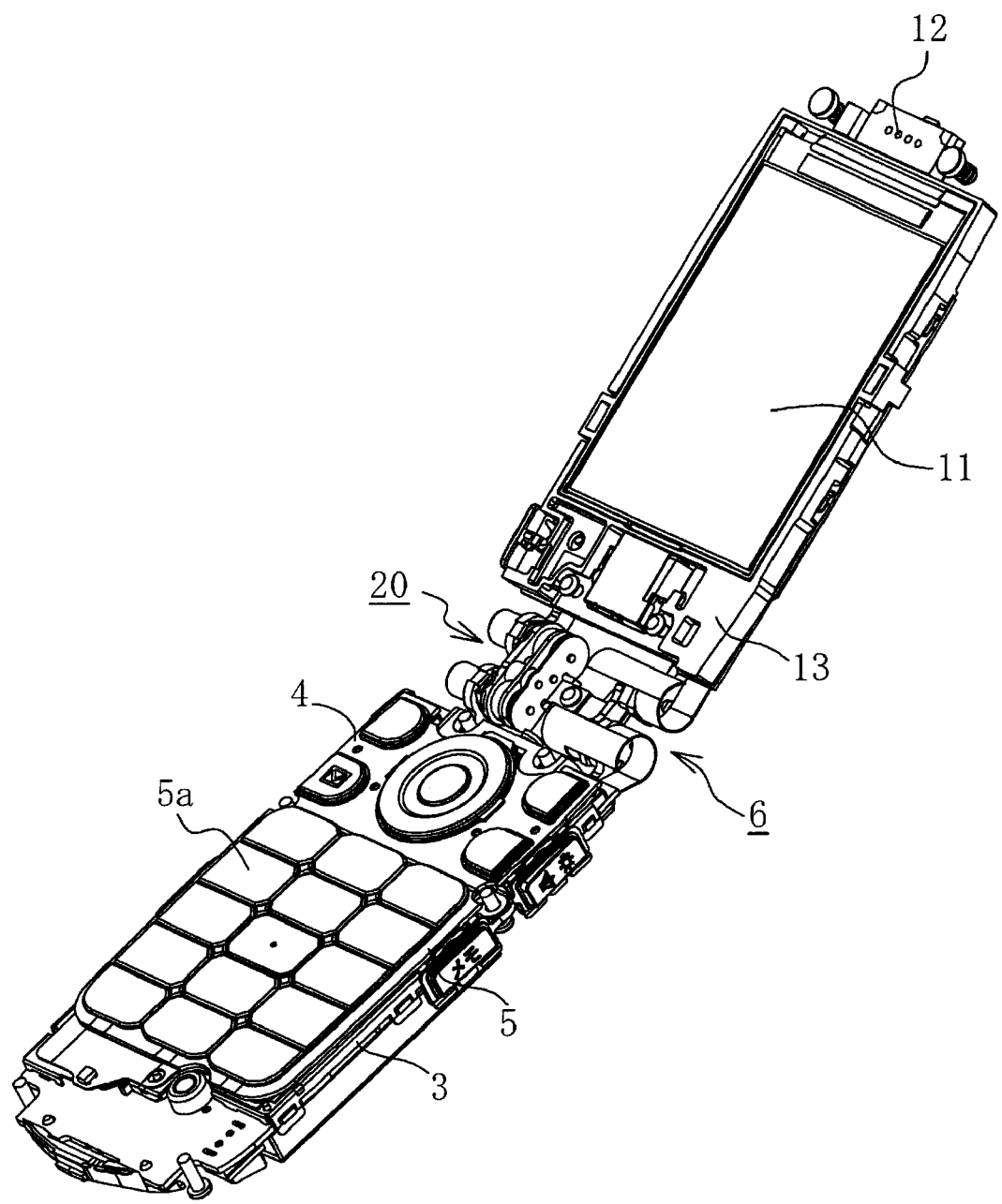
FIG. 2 is a perspective view showing a state in which the housing and case are removed from the mobile telephone of FIG. 1 so that the link mechanism and other internal mechanisms are visible.
Figure 3:
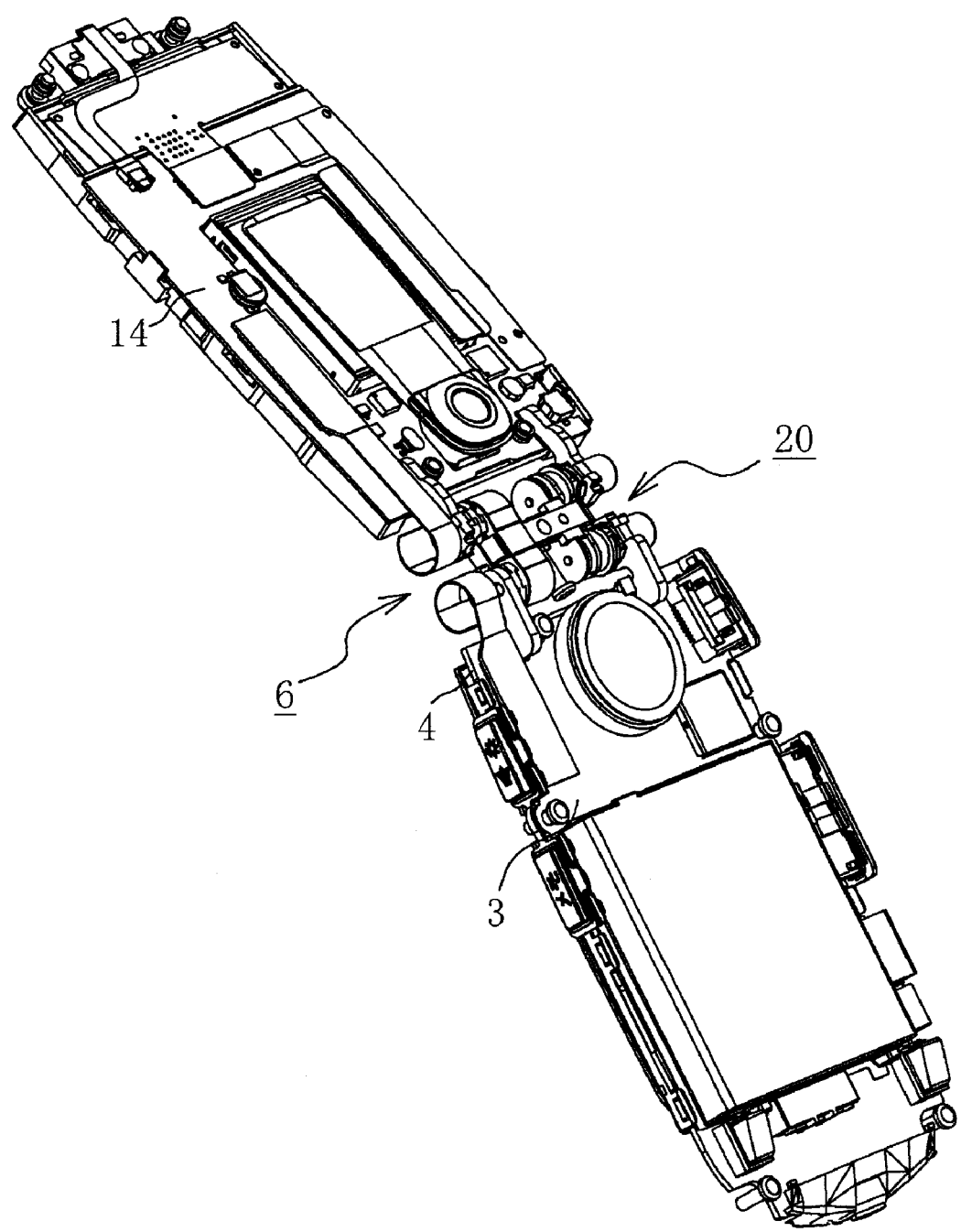
FIG. 3 is a perspective view from the back surface in FIG. 2.
Figure 4A:
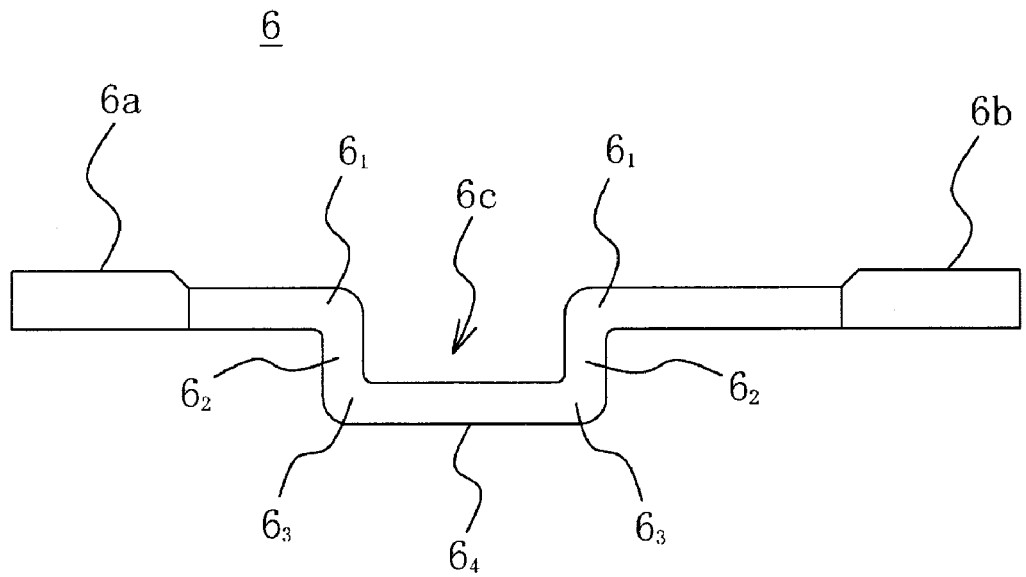
FIG. 4A is a plan view.
Figure 4B:
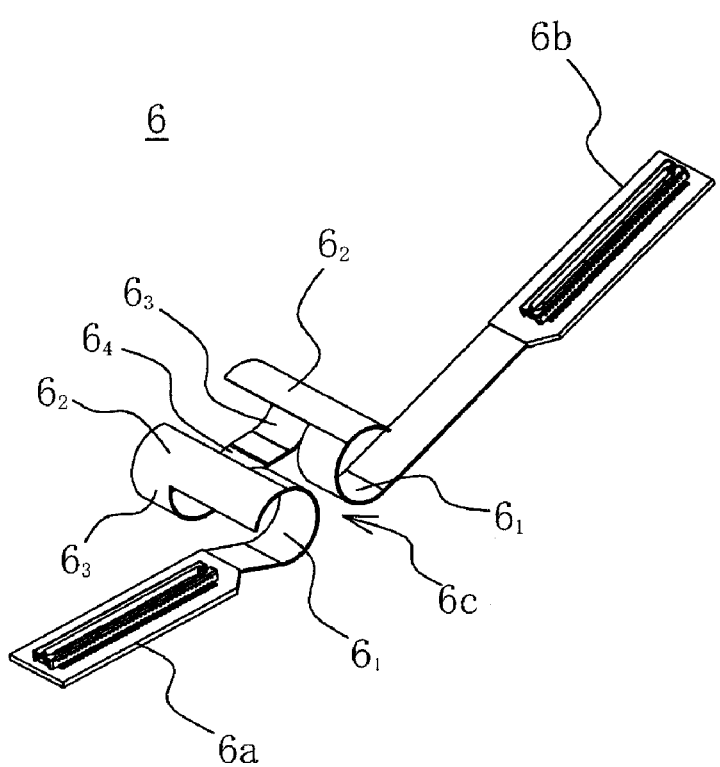
FIG. 4B is a perspective view showing the FPC attached to the mobile telephone.
Figure 5:
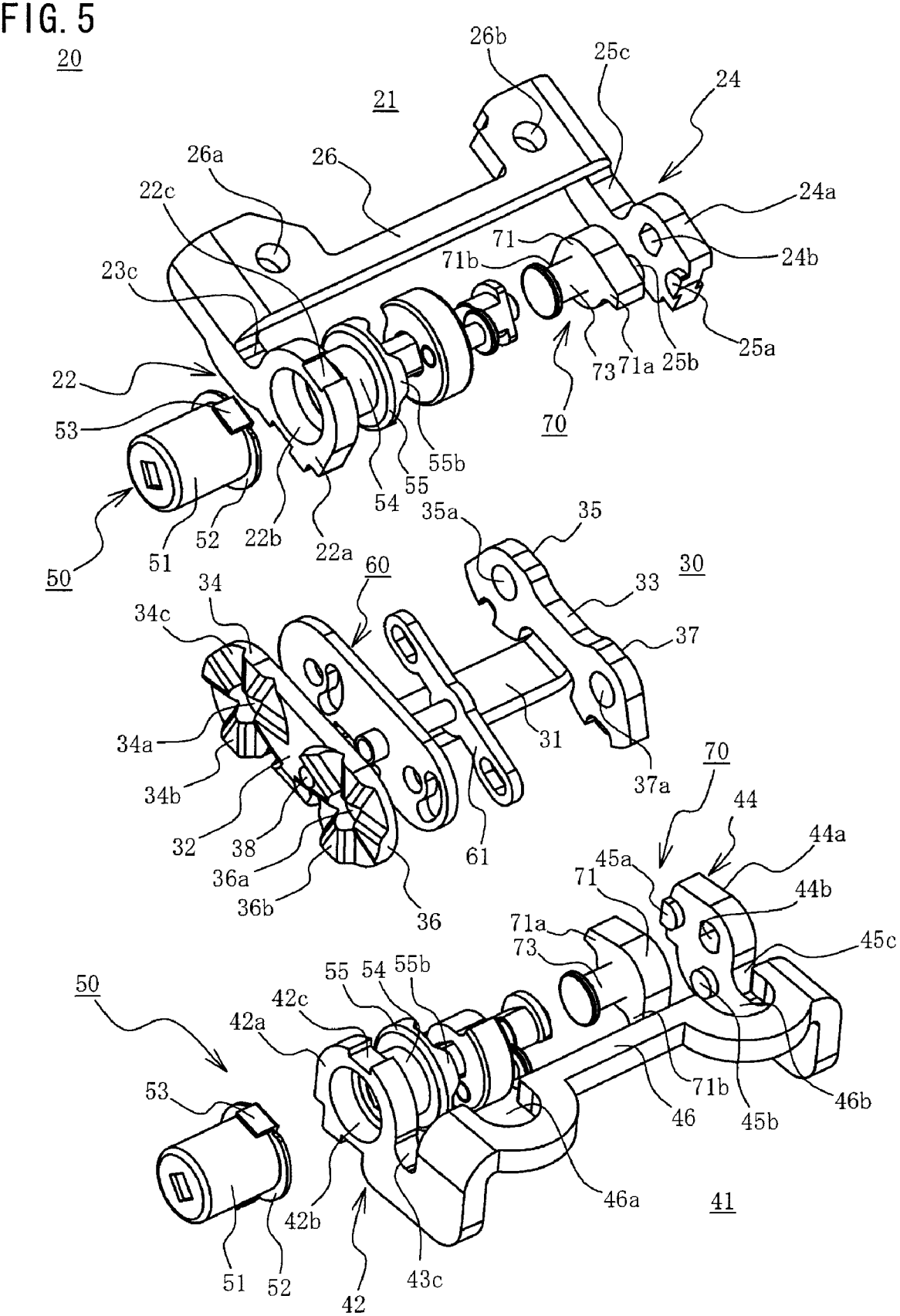
FIG. 5 is an exploded perspective view showing the components of the hinge mechanism.
Figure 6:
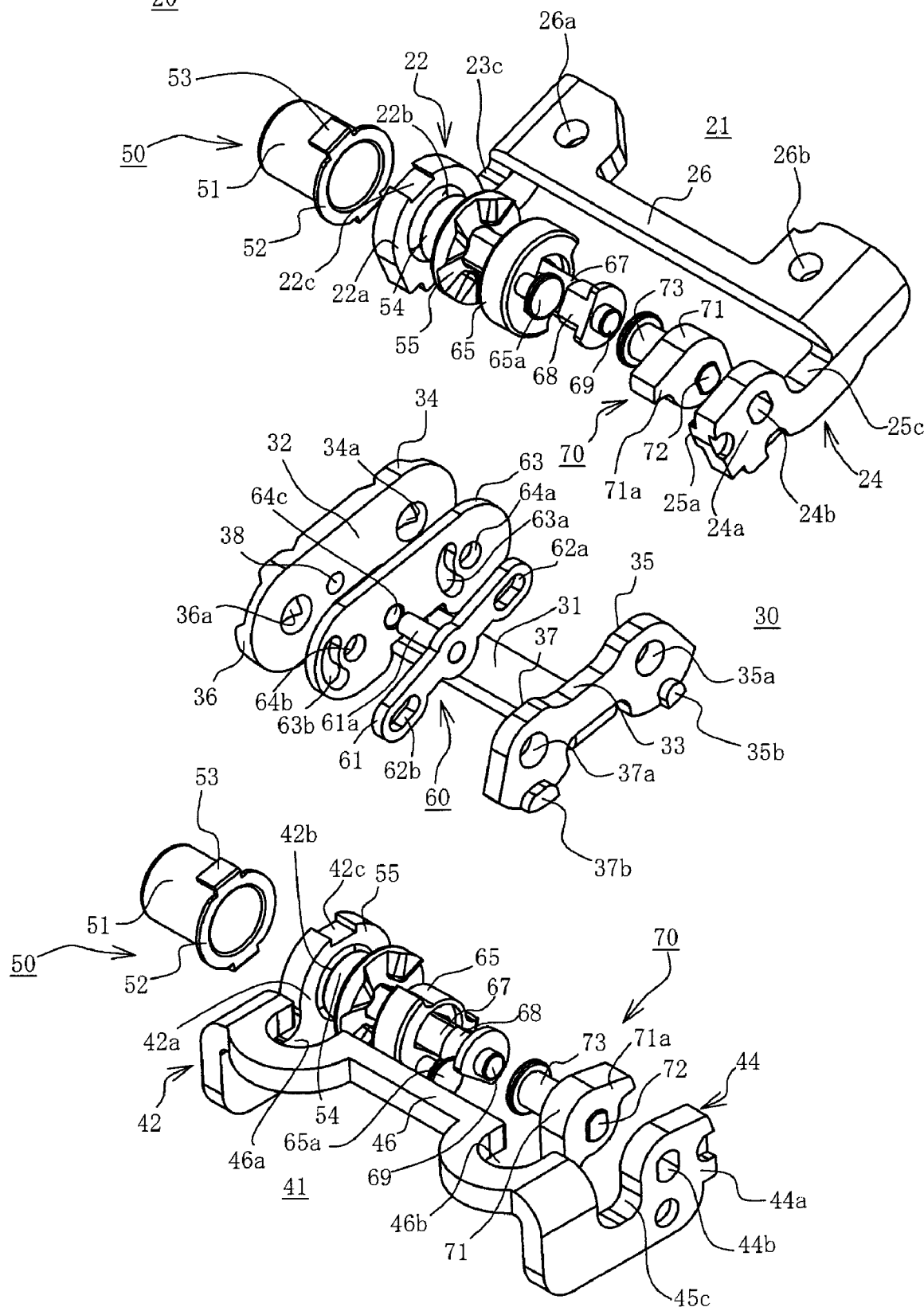
FIG. 6 is an exploded perspective view from a different direction than FIG. 5.

FIG. 1 is a perspective view showing the folding mobile telephone to which the hinge mechanism according to Example 1 of the present invention is applied; FIG. 2 is a perspective view showing a state in which the housing and case are removed from the mobile telephone of FIG. 1 so that the link mechanism and other internal mechanisms are visible; FIG. 3 is a perspective view from the back surface in FIG. 2; FIG. 4 is a diagram showing the FPC, wherein FIG. 4A is a plan view, and FIG. 4B is a perspective view showing the FPC attached to the mobile telephone; FIG. 5 is an exploded perspective view showing the components of the hinge mechanism; FIG. 6 is an exploded perspective view from a different direction than FIG. 5.

As shown in FIGS. 1 through 3, the folding mobile telephone 1 is composed of a transmitter case 2 that accommodates a wireless transceiver circuit, various types of operating keys, a microphone, and other components; a receiver case 10 that accommodates a display unit, a receiver, or the like; and a hinge mechanism 20 for pivotally connecting the transmitter and receiver cases 2, 10. In FIG. 1, the hinge mechanism 20 is covered by a hinge cover C composed of a pair of cover members 7, 8.

The transmitter case 2 has a narrow long box-shaped back surface housing 2a in which a control circuit board 3 and other components are housed inside and in which a speaker opening, a battery attachment part, and the like are formed in the bottom part; a control circuit board 3 provided with a microphone, a speaker, and the like housed in the back surface housing 2a; various types of operating keys 5a through 5c; and a surface housing 2b that covers the open part of the back surface housing 2a and has a plurality of holes through which the various types of operating keys 5a through 5c are exposed. The control circuit board 3, a switchboard for the various types of operating keys, and other components are housed in the back surface housing 2a, and the open part is covered by the surface housing 2b.

A communication control circuit for controlling the communication function, a network control circuit for controlling network connections and the like, and control circuits for controlling other functions are mounted in the control circuit board 3, and the control circuits are controlled by an internally housed CPU. These control circuits are publicly known, and therefore will not be described in detail. The switchboard, an operating sheet member, the control circuit board, and the like are fixed to a support frame 4, and an end part on one side of the support frame 4 is fixed to the second frame 41 of the hinge mechanism 20. A switchboard 5 is provided with the plurality of operating keys 5a through 5c.

The receiver case 10 has an open part 10b' in the surface thereof and is provided with a surface housing 10a; a display panel 11 composed of a liquid crystal display device or the like; a receiver 12 and other parts; and a surface housing 10b that has a display window for exposing the display screen of the display panel 11 and covers the open part of the back surface housing 10a. A receiver 12, a panel control board 14 for controlling the image displayed in the display panel 11, and other components are housed inside the back surface housing 10a. As shown in FIG. 2, the display panel 11, the panel control board 14, and other components are fixed to a support frame 13, and an end part on one side of the support frame 13 is fixed to the first frame 21 of the hinge mechanism 20.

In the present embodiment, the control circuit boards 3, 14 housed in the transmitter case 2 and the receiver case 10 are connected by flexible lead wires, i.e., a flexible printed wiring board (hereinafter referred to as an FPC) 6, as shown in FIGS. 2 and 3. The FPC 6 is composed of a band-shaped body having a narrow width and a prescribed length in which extremely fine wires are formed inside an insulating film, and the center part thereof is curved in a substantial horseshoe shape. The FPC 6 passes from the control circuit board 3 through one corner 15b in which the hinge mechanism 20 of the transmitter case 2 is connected, and the substantially horseshoe-shaped curved portion is disposed inside the hinge mechanism 20, whereby the FPC 6 is connected through the hinge mechanism 20 to the control circuit board 14 via one corner 16b of the receiver case 10.

As shown in FIG. 4A, the FPC 6 is composed of relative elongated terminal pieces 6a, 6b having terminal parts that are connected to the control circuit boards 3, 14 at distal ends; and a connecting piece 6c between the terminal pieces 6a, 6b that is curved in a substantial horseshoe shape and attached to the hinge mechanism 20. The terminal pieces 6a, 6b are formed somewhat wide in comparison to the connecting piece 6c, and are terminal parts connected to the contact terminals (not shown) of the control circuit boards 3, 14.

The connecting piece 6c has first ring parts 61, 61 curved at substantially right angles with respect to the longitudinal direction that are provided in positions extended at prescribed lengths from the other ends of the terminal pieces 6a, 6b; first connection parts $6_2$, $6_2$ extended prescribed lengths at right angles from the first ring parts $6_1$, $6_1$; second ring parts $6_3$, $6_3$ provided to the ends of the first connection parts $6_2$, $6_2$ that are curved at substantially right angles so that the ends of the first connection parts $6_2$, $6_2$ are connected to each other; and a second connection part $6_4$ for connecting the second ring parts $6_3$, $6_3$ to each other. As shown in the drawing, the curve directions of the first ring parts $6_1$, $6_1$ and the second ring parts $6_3$, $6_3$ are set so that the first ring parts $6_1$, $6_1$ and the second ring parts $6_3$, $6_3$ are symmetrical about the center parts thereof in the longitudinal direction. The connecting piece 6c wired along the hinge mechanism 20 is covered by the hinge cover C.

In the wiring of the FPC 6 inside the mobile telephone 1, as shown in FIGS. 2 and 4B, the first ring parts $6_1$, $6_1$ of the connecting piece 6c are disposed inside the corners 15b, 16b on one side positioned on the side surfaces of the second arm piece 24 of the first frame 21, and the fourth arm piece 44 of the second frame 41 of the hinge mechanism 20, the first ring parts $6_1$, $6_1$ are rotated a prescribed angle, e.g., 180°, about the two rotation shafts of the hinge mechanism 20 in the corners 15b, 16b on one side, and portions of the first connection parts $6_2$, $6_2$ are inserted in U-shaped grooves 25c, 45c formed in arm parts of the second arm piece 24 and the fourth arm piece 44. The second ring parts $6_3$, $6_3$ are disposed near the middle in the longitudinal direction of the first and second frames 21, 41 and further rotated 180°, for example, about the two rotation shafts of the hinge mechanism 20, whereupon the second connection part $6_4$ is fixed on the joining piece 31 of the connecting member 30 of the hinge mechanism 20.

The FPC 6 has the first ring parts $6_1$, $6_1$, the first connection parts $6_2$, $6_2$, and the second ring parts $6_3$, $6_3$ at the connecting piece 6c, and the second ring parts $6_3$, $6_3$ are connected by the second connection part $6_4$, whereby there are no portions of the FPC 6 in which twisting can occur, even when the mobile telephone 1 is opened and closed. More specifically, since the corner 15b on one side in which the FPC 6 of the mouthpiece case 2 is wired, and the corner 16b on one side in which the FPC 6 of the receiver case 10 is wired are adjacent to each other on a straight line, twisting can be prevented. Since the hinge mechanism 20 also has two rotation shafts in the mobile telephone 1, although the FPC 6 wired along the rotation shafts is subjected to the stress of 160° of rotation in the FPC that is wired in the hinge mechanism portion in the open state of 160°, for example, in a case in which one rotation shaft is provided, the rotation angle that occurs in one rotation shaft when two rotation shafts are provided is half (80°) the rotation angle of the case in which one shaft is provided, the rotation angle that occurs in one rotation shaft is reduced, and the stress placed on the FPC 6 is distributed among the two shafts. The service life of the FPC 6 can therefore be markedly increased. Since the ring parts $6_1$, $6_1$, $6_3$, $6_3$ as curves are also provided two apiece on the two rotation shafts, the stress on the rotation shafts can be furthermore distributed.

The hinge mechanism is also composed of two rotation shafts, whereby a large amount of space is created inside the hinge mechanism 20 in comparison to a single-shaft hinge mechanism, and this space can be used to allow the FPC 6 to twist during opening and closing of the mobile telephone. The stress occurring in the FPC 6 can therefore be reduced.

Consequently, no unnecessary stress is applied to the FPC 6, and severing of the wiring and other accidents due to twisting can be prevented. When the second connection part $6_4$ is fixed by double-sided tape or other fixing means to the joining piece 31 of the connecting member 30 of the hinge mechanism 20, the second connection part $6_4$ no longer moves and becomes damaged from catching on obstructions.

In the example described above, the control boards of the mouthpiece case 2 and the receiver case 10 are connected by the FPC 6, but the present invention is not limited by this configuration, and a coaxial cable or the like, for example, may also be used. In this case, when the coaxial cable is provided in crank fashion so as to pass through the central axis portions of the rotation shafts of the link mechanism, the stress on the coaxial cable can be reduced in the same manner as when the FPC 6 is used.

Furthermore, a configuration was adopted in this example in which the FPC 6 was rotated a prescribed angle along the rotation shafts in the first ring parts $6_1$, $6_1$ and the second ring parts $6_3$, $6_3$ when the FPC 6 was provided along the rotation shafts. However, a crank-shaped FPC 6 may be provided without being rotated in this manner, and since a comparatively large space is still present inside the hinge mechanism 20 in this case, flexing and twisting of the FPC 6 can be satisfactorily minimized.

As shown in FIGS. 5 and 6, the hinge mechanism 20 is composed of a pair of first and second frames 21, 41 that are attached to the support frames 4, 13 housed in the transmitter and receiver cases 2, 10; a connecting member 30 as a third frame for connecting the first and second frames 21, 41; first and second drive mechanisms 50, 50 for restricting/retaining the driving of the first and second frames 21, 41 when the first and second frames 21, 41 connected by the connecting member 30 are each rotated from the folded position to a prescribed angle; a link mechanism 60 for linking the first and second frames 21, 41 and coordinating the driving of both frames; and stopper mechanisms 70, 70 for maintaining the open state and the closed state during opening and closing of the transmitter case 2 and the receiver case 10.

The components constituting the first and second frames 21, 41, the connecting member 30, the first and second drive mechanisms 50, 50, the link mechanism 60, and the stopper mechanisms 70, 70 are almost all composed of metal rigid bodies, and are formed by stamping out metal panels and pressing curves into the panels. Stainless steel spring material (e.g., SUS304CSP-1/2H) having high strength, high rigidity, and high toughness is preferred as the metal material. The plate thickness of the first and second frames 21, 41 is 1.5 mm, for example, and the plate thickness of the connecting member 30 is 1.2 mm, for example. Forming each component from a metal material in this manner enables the hinge mechanism to have high mechanical strength in comparison to a hinge mechanism that is manufactured from the conventional resin material, and the size of the components can therefore be reduced. The entire hinge mechanism 20 is also formed by a metal rigid body, whereby the support frames 4, 13 are electrically connected, and the reception surface area of an antenna provided to any of the support frames 4, 13 can therefore be increased, and the performance of the antenna can be enhanced.

The first and second frames 21, 41 are housed without providing any protruding parts inside concave parts that are formed in the connecting location of the folded transmitter and receiver cases 2, 10.

As shown in FIGS. 5 and 6, the first frame 21 is composed of a joining piece 26 having a prescribed length, and a pair of first and second arm pieces 22, 24 having a prescribed length that are folded at substantially right angles in the same direction from both ends of the joining piece 26. The first frame 21 is attached to the support frame 13 of the receiver case 10, and has an overall horseshoe shape as viewed in a plane.

The length of the joining piece 26 is shorter than the width of the receiver case 10; joining parts 22a, 24a are formed at the distal end parts in the first and second arm pieces 22, 24; and U-shaped grooves 23c, 25c for inserting an FPC, lead wires, or the like are formed in the arm parts of the first and second arm pieces 22, 24.

The joining part 22a of the first arm piece 22 is a ring-shaped attachment ring having an opening 22b large enough to enable insertion of a cylindrical cap 51. A groove 22c into which a bridge end 53 is inserted is formed in a flange end 52 of the cylindrical cap 51 on the external periphery of the joining part 22a.

The joining part 24a of the second arm piece 24 is composed of a plate-shaped body having a prescribed size, a non-circular attachment hole 24b for attaching a first attachment shaft 72 of a stopper member 71 is formed in the plate-shaped body, and a pair of protrusions 25a, 25b for fixing the stopper member 71 in position is formed in one surface (the surface facing the first arm piece 22) of the plate-shaped body.

The height (height from the plate-shaped body surface) of the protrusions 25a, 25b is shorter than the thickness of the stopper member 71. Specifically, the protrusions 25a, 25b are formed at the rear, and are provided on the external peripheral edge of the second arm piece 24 on an imaginary line in a fan shape that is opened a prescribed angle with the attachment hole 24b at the center. The protrusions 25a, 25b are formed by stamping from the other surface of the second arm piece 24.

The joining piece 26 is in a belt shape, and attachment holes 26a, 26b attached to the support frame 13 are formed near both end parts thereof.

The second frame 41 has substantially the same shape as the first frame 21; is composed of a joining piece 46 having a prescribed length, and a pair of third and fourth arm pieces 42, 44 having a prescribed length that are folded at substantially right angles in the same direction from both ends of the joining piece 46; and is attached to the support frame 4 of the transmitter case 2.

The length of the joining piece 46 is shorter than the width of the transmitter case 2; joining parts 42a, 44a are formed at the distal end parts in the third and fourth arm pieces 42, 44; and U-shaped grooves 43c, 45c for inserting an FPC, lead wires, or the like are formed in the arm parts of the third and fourth arm pieces 42, 44.

The joining part 42a of the third arm piece 42 is a ring-shaped attachment ring having an opening 42b large enough to enable insertion of a cylindrical cap 51. A groove 42c into which a bridge end 53 is inserted is formed in a flange end 52 of the cylindrical cap 51 on the external periphery of the joining part 42a.

The joining part 44a of the fourth arm piece 44 is composed of a plate-shaped body having a prescribed size, and a non-circular attachment hole 44b for attaching the stopper member 71 is formed in the plate-shaped body, and a pair of protrusions 45a, 45b for fixing the stopper member 71 in position is formed in one surface (the surface facing the third arm piece 42) of the plate-shaped body.

The height of the protrusions 45a, 45b is the same as that of the protrusions 25a, 25b of the first frame. The protrusions 45a, 45b are formed at the rear, and are provided on the external peripheral edge of the fourth arm piece 44 on an imaginary line in a fan shape that is opened a prescribed angle with the attachment hole 44b at the center. The protrusions 45a, 45b are formed by stamping from the other surface of the fourth arm piece 44.

The joining piece 46 is in a belt shape, and U-shaped grooves 46a, 46b for attachment to the support frame 4 are formed near both end parts thereof.

As shown in FIGS. 5 and 6, the connecting member 30 has a joining piece 31 having a shorter length than the joining piece 26 of the first frame 21, and first and second connecting pieces 32, 33 that are folded at substantially right angles in the same direction from both ends of the joining piece 31, and the first and second connecting pieces 32, 33 and the joining piece 31 are integrally joined. The first and second connecting pieces 32, 33 are composed of substantially oblong elliptical plate-shaped bodies that are branched to the left and right, a portion of the external peripheral edge of the center part in the longitudinal direction is joined to the end part of the joining piece 31, and the left and right of the joining part as the center form the first and third joining parts 34, 36 and the second and fourth joining parts 35, 37.

A fixing hole 38 for attaching the actuation bar 61 of the link mechanism 60 described hereinafter is formed in the substantial center of the first connecting piece 32. Attachment holes 34a, 36a through which an actuation stick 67 is inserted are formed in the first and third joining parts 34, 36, and a plurality of cams 34b, 36b are integrally formed by pressing or the like in the external surface, i.e., the surface that faces the internal surface of the first and third arm pieces 22, 42 when assembled. The cams 34b, 36b are formed in radial fashion about the attachment holes 34a, 36a.

The second connecting piece 33 is provided with second and fourth joining parts 35, 37, and attachment holes 35a, 37a in which second attachment shafts 73, 73 provided to the stopper members 71, 71 are mounted, and locking protrusions 35b, 37b provided to the external edge parts of the second and fourth joining parts 35, 37 for limiting the rotation of the stopper members 71, 71 to a prescribed angle in the state in which the stoppers members 71, 71 are mounted are each formed in the second connecting piece 33. Consequently, when the stopper members 71, 71 are rotated a prescribed angle, locking tabs 71a, 71b collide with the locking protrusions 35b, 37b, and the rotation is limited. This rotation limiting limits the rotation of the second and fourth arm pieces 24, 44, i.e., the rotation of the first and second frames 21, 41.

Specifically, since the stopper members 71, 71 are fixed so as to be prevented from rotating in the attachment holes 24b, 44b of the second and fourth arm pieces 24, 44, and the protrusions 25a, 25b, 45a, 45b, when the second and fourth arm pieces 24, 44 are rotated, the stopper members 71, 71 also rotate in conjunction with this rotation, and when the stopper members 71, 71 have rotated to a prescribed angle, the locking tabs 71a, 71b of the stopper members 71, 71 collide with the locking protrusions 35b, 37b, and the rotation is limited.

The height of the locking protrusions 35b, 37b is lower than the thickness of the stopper member 71 described hereinafter, and the locking protrusions 35b, 37b are formed at the bottom parts of the second and fourth joining parts 35, 37, respectively. The length obtained by adding the heights of both protrusions is slightly shorter than the thickness of the stopper member 71 so that the protrusions 25a, 25b, 45a, 45b provided to the second and fourth arm pieces 24, 44, and the locking protrusions 35b, 37b provided to the second and fourth joining parts 35, 37 do not touch each other.

The stopper mechanism 70 will first be described hereinafter.

The stopper mechanism 70 is composed of the pair of stopper members 71, 71 fixed to the first and second frames 21, 41, and the locking protrusions 35b, 37b that come into contact with and limit the rotation of the stopper members 71, 71 in conjunction with the rotation of the first and second frames 21, 41.

Since the stopper members 71, 71 both have the same structure, the stopper member 71 attached to the second arm piece 24 will be described hereinafter. However, the stopper member 71 attached to the second arm piece 24, and the stopper member 71 attached to the fourth arm piece 44 are disposed so as to have left-right symmetry about the connecting member 30.

The stopper member 71 has a substantially circular shape in which the locking tabs 71a, 71b protrude in the direction of the normal lines from two locations of the external peripheral edge of a plate-shaped body having a prescribed thickness, and is substantially crescent shaped in plan view. The stopper member 71 has first and second attachment shafts 72, 73 in the substantial center of the back surface thereof, and the crescent-shaped distal end part forms the locking tabs 71a, 71b. The locking tabs 71a, 71b are separated a prescribed angle θ (not shown) about the first attachment shaft 72. The first attachment shaft 72 is formed in a non-circular shape so as to be fit into the attachment hole 24b, and stops rotation by fitting into the attachment hole 24b of the second arm piece 24. The second attachment shaft 73 has a girth that allows insertion into the attachment hole 35a of the second joining part 35, and is slightly longer than the thickness of the second joining part 35. The distal end part of the second attachment shaft 73 inserted in the attachment hole 35a is formed so that the second attachment shaft 73 is fixed so as to be able to rotate in the attachment hole 35a. The angle θ formed by the locking tabs 71a, 71b is the angle obtained by equally dividing the desired maximum rotation angle when the locking tabs 71a, 71b are installed in the mobile telephone 1, and adding the extension angle in the circumferential direction of the locking protrusions 35b, 37b to the angle, for example.

The stopper member 71 is fabricated from a metal material, particularly stainless steel having high mechanical strength. When the stopper member 71 is fabricated from such a metal member, the locking tabs 71a, 71b are locked by the locking protrusions 35b, 37b even when an excessive force is applied to one of the first and second frames 21, 41, and breakage therefore does not easily occur.

Through holes (not shown) through which the first and second attachment shafts 72, 73 also pass may be formed in the shaft center parts of the stopper members 71, 71, and a coaxial cable for electrically connecting the transmitter and receiver cases 2, 10 is inserted through the through holes to form a connection between the substrates.

The drive mechanism 50 will next be described.

Drive mechanisms 50, 50 are provided to the joining part 22a of the first arm piece 22 of the first frame 21, and to the joining part 42a of the third arm piece 42 of the second frame 41. The drive mechanisms 50, 50 are provided with a cam mechanism for restricting/retaining the first and second frames 21, 41 in a prescribed position, and a spring body for driving the cam mechanism; and the frames are intermittently moved in accordance with the rotation of the first and second frames 21, 41. Since the drive mechanisms provided to the first arm piece 22 and the third arm piece 42 have the same configuration, the same reference numerals are used, and only the drive mechanism 50 attached to the first arm piece 22 will be described hereinafter.

The cam mechanism is composed of cams 34b provided to the mounting surface 34, and a disk-shaped cam plate 55 that has a cam 55b on one surface for meshing with the cams 34b. A spring body pushing part 54 pushed by a spring body (not shown) in which one end thereof is provided inside the cylindrical cap 51 is provided to the cam plate 55, and the other end is integrally fixed to a rod-shaped actuation stick 67 that is connected to the link mechanism 60. The spring body pushing part 54 of the cam plate 55 has a prescribed thickness and a diameter substantially the same as the diameter of the open part of the cylindrical cap 51, and a plurality of cams 55b is formed in radial fashion from the actuation stick 67 on the internal surface of the spring body pushing part 54, i.e., the surface that faces one surface of the first joining part 34. The cam plate 55 is provided with concave parts 55c between the cams 55b so as to mesh with the cams 34b of the first joining part 34. In the same manner, concave parts 34c are provided between the plurality of cams 34b provided to the external surface of the first joining part 34. The cylindrical cap 51 is fixed inside the attachment hole 22b of the joining part 22a by the bridge piece 53, and the spring pushing part 54 of the cam plate 55 is fixed to the cylindrical cap 51. The cam plate 55 therefore rotates in conjunction with the rotation of the first frame 21. The rear end parts of the cylindrical caps 51 protrude from the first and third arm pieces 22, 42, but the rear end parts are housed in the other corners 15a, 16a of the transmitter and receiver cases 2, 10 during assembly.

The cams 34b, 55b are preferably provided in accordance with the angle when the mobile telephone 1 is in the open state. For example, when the open state of the mobile telephone 1 is 160°, the transmitter and receiver cases 2, 10 are fixed at the moment the cams mesh when the intervals between the cams are set to 160° or at every 80°, the transmitter and receiver cases 2, 10 are stable in the open state, the closed state, and in between the open state and the closed state.

Through this configuration, when the first and second frames 21, 41 are rotated, the cam plate 55 of the drive mechanism 50 rotates, and the cams 55b provided to the cam plate 55 move against the urging force of the spring body so as to run over the meshed cams 34b, 36b of the first and third joining parts 34, 36. Suitable resistance is thereby created when the cams are not meshed together, and a snap action is created during rotation.

The link mechanism 60 will next be described.

The link mechanism 60 is provided with a pair of cam bridge pieces 65 provided to the first and third arm pieces 22, 42, that have a protruding rod 65a on one surface thereof and rotate in coordinated fashion with the rotation of the first and third arm pieces 22, 42; a restricting plate 63 fixed to the first connecting piece 32 of the connecting member 30; an actuation bar 61 for linking the rotation of the first and third arm pieces 22, 42, composed of an elongated rod-shaped body fixed to the connecting member 30 so as to be able to rotate by a shaft rod 61a provided to the center part, in which both end parts of the actuation bar 61 are fixed to the protruding rod 65a that is passed through restricting holes 63a, 63b provided to the restricting plate 63; and when any one of the drive mechanisms 50, 50 is driven, the other drive mechanism is operated in coordinated fashion.

The cam bridge pieces 65 are fixed to the first and third arm pieces 22, 42 by fixing members 68 provided to the distal end parts of the actuation stick 67, and are coordinated with the drive mechanisms 50, 50 provided to both arm pieces. Small protrusions 69 that are locked in locking holes 64a, 64b of the restricting plate 63 are provided to the distal end parts of the fixing member 68. The cam bridge pieces 65 are substantially half-moon shaped, protruding rods 65a for engaging with the restricting holes 63a, 63b of the restricting plate 63 are formed in positions at a prescribed distance from the rotational axis of the internal surfaces of the cam bridge pieces 65, and the protruding rods 65a slide in an arc in accordance with the rotation of the cam bridge pieces 65.

The restricting plate 63 is composed of a substantially elliptical plate-shaped body having substantially the same length and width as the first connecting piece 32, and is provided with locking holes 64a, 64b into which the small protrusions 69 provided to the distal end part of the fixing member 68 are locked at both end parts in the longitudinal direction of the disk-shaped body, and restricting holes 63a, 63b into which the protruding rods 65a are inserted, that are composed of narrow groove openings formed in curved fashion through a prescribed angle about the locking holes. The protruding rods 65a inserted in the restricting holes 63a, 63b can slide in the holes, and the movement thereof is restricted to a prescribed position.

The actuation bar 61 is composed of a rod-shaped body having substantially the same length as the restricting plate 63. Elliptical holes 62a, 62b provided with a prescribed length of play in the longitudinal direction are provided to both end parts of the actuation bar 61, and the protruding rods 65a of the cam bridge pieces 65 are inserted in the holes 62a, 62b.

In the link mechanism 60 configured as described above, when the hinge mechanism 20 is moved by rotating the first frame 21 from the open state to the closed state, the cam bridge pieces 65 connected to the first arm piece 22 rotate in conjunction with the rotation of the rotated first frame 21, whereby the protruding rods 65a of the cam bridge pieces 65 move within the restricting holes 63a in the counterclockwise direction as viewed from the right. In conjunction with this rotation, a force in the counterclockwise direction is also applied to the hole 62a on an end on one side of the actuation bar 61, and the actuation bar 61 rotates in the clockwise direction about the shaft rod 61a. A force in the clockwise direction is then applied to the protruding rods 65a of the cam bridge pieces 65 connected to the third arm piece 42, which are connected to hole 62b on an end on the other side of the actuation bar 61, whereby the cam bridge pieces 65 move in the clockwise direction, and the third arm piece 42 rotates clockwise in the same manner in conjunction with this movement. The first frame 21 and the second frame 41 thereby rotate in opposite directions from each other. Since it is apparent that the same operation also occurs during movement from the closed state to the open state, this operation will not be described.

Assembly of the hinge mechanism 20 will next be described with reference to FIGS. 5 and 6.

The stopper members 71, 71 are first mounted to the second connecting piece 33 of the connecting member 30. In the mounting of the stopper members 71, the second attachment shafts 73 of the stopper members 71 are inserted in the attachment holes 35a, 37a provided to the second and fourth joining parts 35, 37 of the second connecting piece 33, and lugs are formed at the tips of the shafts so that the shafts do not come out of the attachment holes 35a, 37a. FIGS. 5 and 6 show a state in which the lugs are already formed.

The cylindrical cap 51 is inserted from the inside of the attachment holes 22b, 42b of the first and third arm pieces 22, 42, and the flange end 52 of the cylindrical cap 51 is inserted and positioned in the grooves 22c, 42c of the first and third arm pieces 22, 42. A coiled spring body (not shown) is then inserted into the cylindrical cap 51. The spring body pushing part 54 of the cam plate 55 is inserted/fixed in the cylindrical cap 51, and the connecting member 30 and the first and second frames 21, 41 are then attached. In this attachment, the cam plate 55 pressed by the spring body is pushed against the spring body, and in this state, the first through fourth joining parts 34 through 37 of the connecting member 30 are positioned between the first and third arm pieces 22, 42 and the second and fourth arm pieces 24, 44, the first attachment shafts 72, 72 of the stopper members 71, 71 mounted to the second and fourth joining parts 35, 37 of the second connecting piece 33 are inserted into the attachment holes 24a, 44a of the second and fourth arm pieces 24, 44 and attached so as to be prevented from rotating, and the locking tabs 71a, 71b of the stopper members 71, 71 are brought into contact with and fixed to the protrusions 25a, 25b and 45a, 45b.

The actuation stick 67 is inserted through the attachment holes Ma, 36a and the center part of the cam plate 55 so as to reach the bottom part of the internal surface of the cylindrical cap 51, and the cams 34b, 36b of the first and third joining parts 34, 36 are meshed with the cams 55b of the cam plate 55.

The cam bridge pieces 65 are then mounted to the actuation stick 67. In this mounting, the actuation stick 67 is inserted through the cam bridge pieces 65, the fixing member 68 is attached to the distal end part of the actuation stick 67, and the cam bridge pieces 65 are fixed to the fixing member 68 so as to be prevented from rotating. The shaft rod 61a of the actuation bar 61 is inserted into the fixing hole 38 via a passage hole 64c of the restricting plate 63 so as to be able to rotate, and is then inserted to the small protrusion 69 at the distal end part of the fixing member 68 through the locking holes 64a, 64b of the restricting plate 63. Furthermore, the protruding rods 65a of the cam bridge pieces 65 are inserted through the holes 63a, 63b of the restricting plate 63, and the holes 62a, 62b formed at both end parts of the actuation bar 61, and lugs are formed at the distal ends of the protruding rods.

Figure 7:
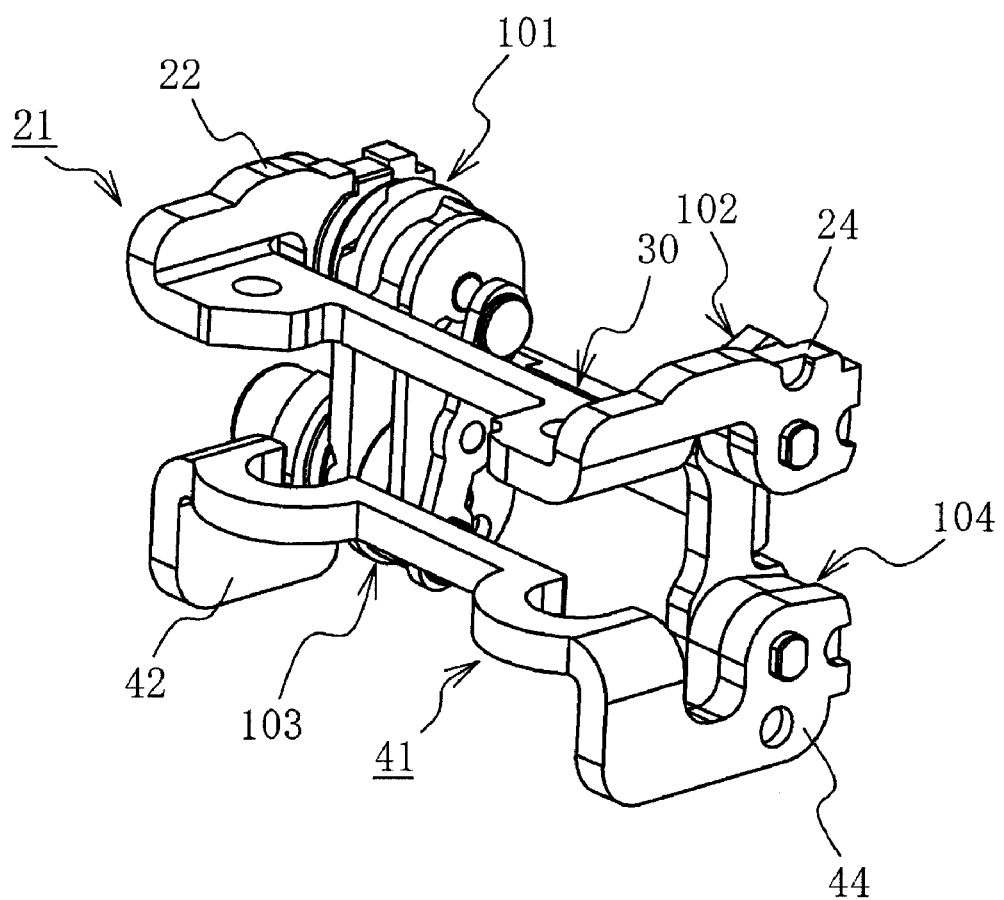
FIG. 7 is a perspective view showing a case in which the hinge mechanism is closed when the hinge mechanism shown in FIGS. 5 and 6 is in the assembled state.
Figure 8:
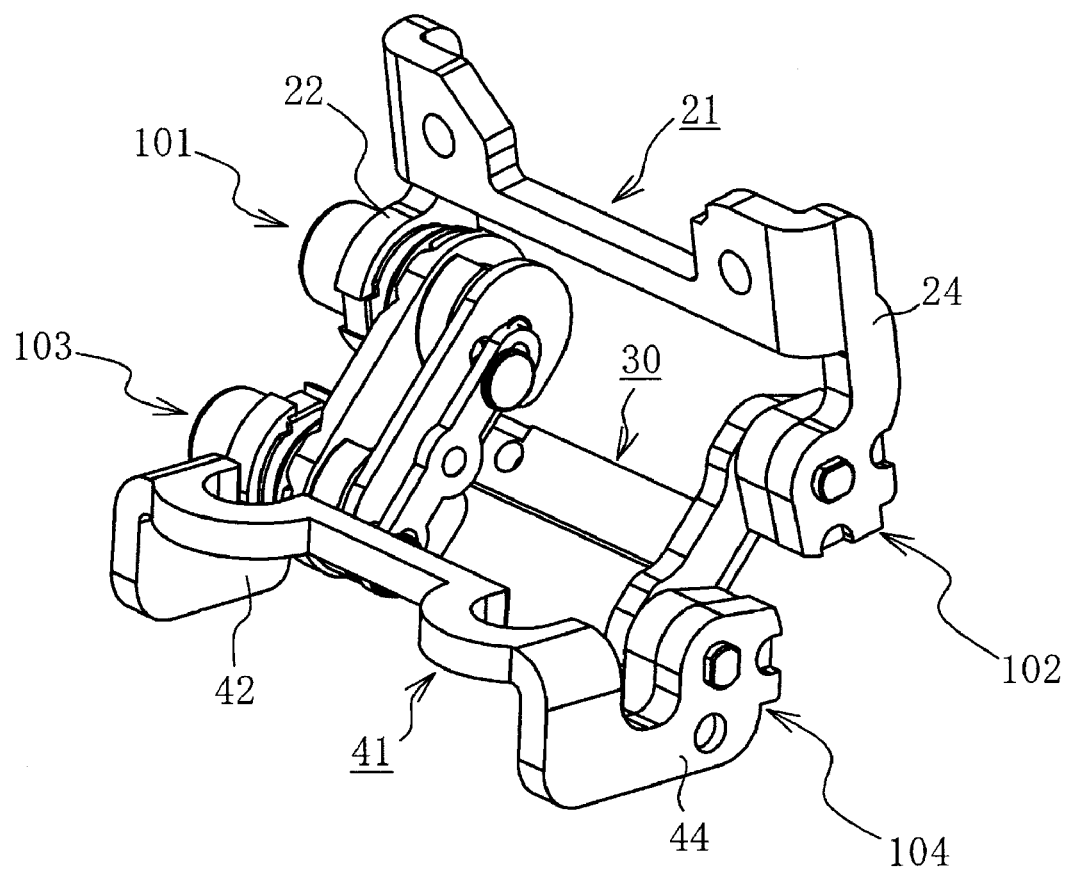
FIG. 8 is a perspective view showing a case in which the hinge mechanism is between opening and closing when the hinge mechanism shown in FIGS. 5 and 6 is in the assembled state.
Figure 9:
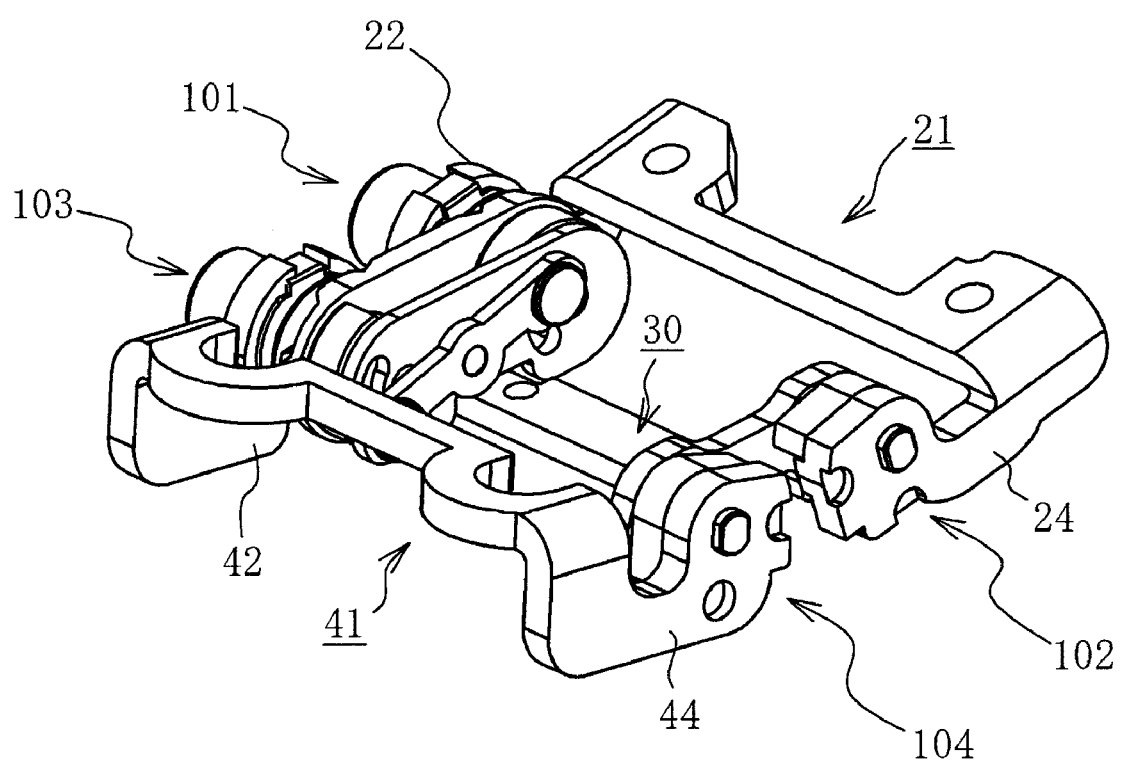
FIG. 9 is a perspective view showing a case in which the hinge mechanism is open when the hinge mechanism shown in FIGS. 5 and 6 is in the assembled state.

FIGS. 7 through 9 show the assembled state of the hinge mechanism shown in FIGS. 5 and 6. FIG. 7 is a perspective view showing a case in which the hinge mechanism is closed; FIG. 8 is a perspective view showing a case in which the hinge mechanism is between opening and closing; and FIG. 9 is a perspective view showing a case in which the hinge mechanism is open.

In the assembled hinge mechanism 20 as shown in FIGS. 7 through 9, the connecting member 30 and the first and second frames 21, 41 are integrally formed by a first connecting part 101 in which the first arm piece 22 and the first joining part 34 are connected, a second connecting part 102 in which the second arm piece 24 and the second joining part 35 are connected, a third connecting part 103 in which the third arm piece 42 and the third joining part 36 are connected, and a fourth connecting part 104 in which the fourth arm piece 44 and the fourth joining part 37 are connected. The drive mechanism 50 and the link mechanism 60 are provided to the first and third connecting parts 101, 103, and the stopper mechanism 70 is provided to the second and fourth connecting parts 102, 104.

Figure 10A:
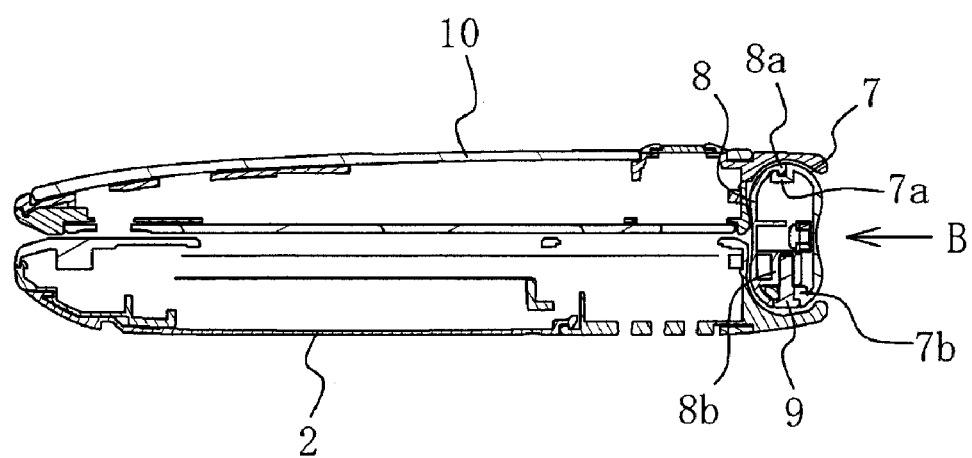
FIG. 10A is a side sectional view showing a state in which both cases are folded in a state in which the transmitter and receiver cases of FIG. 1 are cut along line A-A.
Figure 10B:
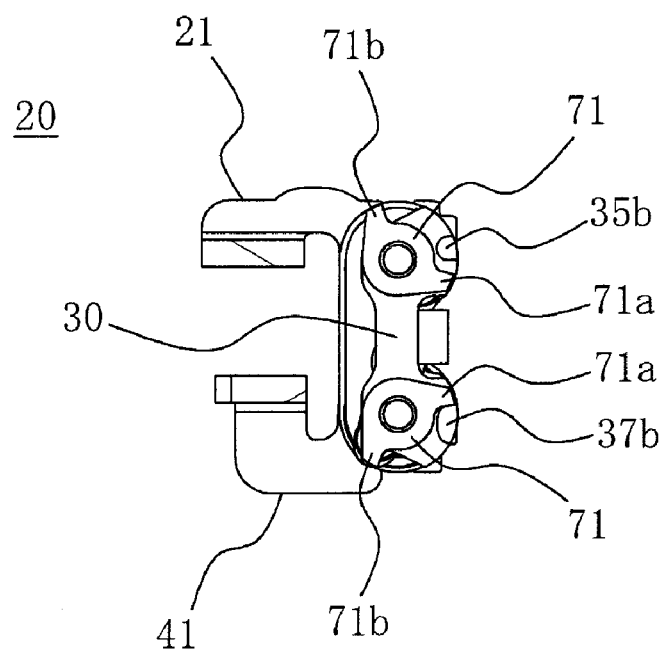
FIG. 10B is an enlarged side sectional view showing the hinge mechanism in the state shown in FIG. 10A.
Figure 11A:
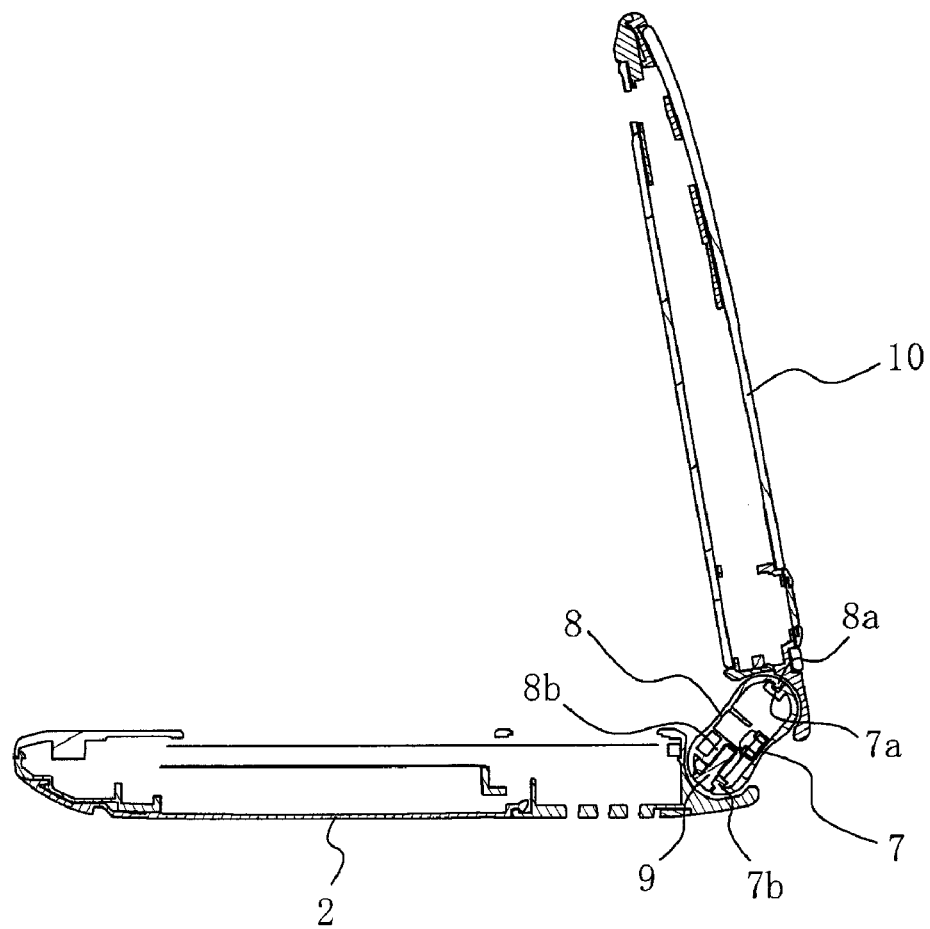
FIG. 11A is a side sectional view.
Figure 11B:
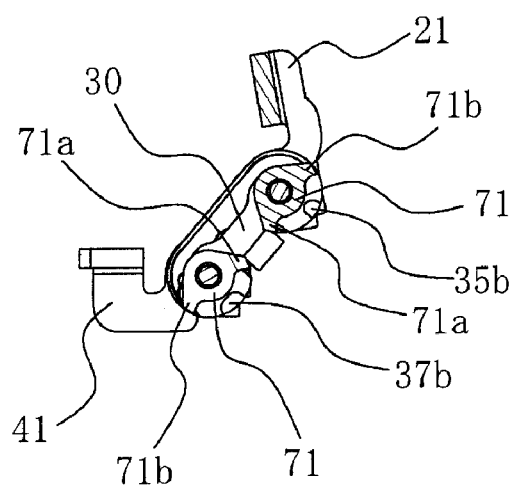
FIG. 11B is an enlarged side sectional view showing the hinge mechanism in the state shown in FIG. 11A.

FIG. 10 is a diagram showing the relationship between the hinge mechanism and the folded state of the transmitter and receiver cases, wherein FIG. 10A is a side sectional view showing a state in which both cases are folded in a state in which the transmitter and receiver cases of FIG. 1 are cut along line A-A, and FIG. 10B is an enlarged side sectional view showing the hinge mechanism in the state shown in FIG. 10A. FIG. 11 is a diagram showing a state in which the transmitter and receiver cases of FIG. 10 are opened to 80°, wherein FIG. 11A is a side sectional view, and FIG. 11B is an enlarged side sectional view showing the hinge mechanism in the state shown in FIG. 11A. FIG. 12 is a diagram showing a state in which the transmitter and receiver cases of FIG. 10 are opened to 160°, wherein FIG. 12A is a side sectional view, and FIG. 12B is an enlarged side sectional view showing the hinge mechanism in the state shown in FIG. 12A. The link mechanism is omitted in FIGS. 10A, 11A, and 12A so as to make the shape of the housing in the connecting parts easier to recognize, and the hinge mechanism 20 in FIGS. 10B, 11B, and 12B is cut at a prescribed position to make the stopper member visible.

As shown in FIGS. 10A, 11A, and 12A, the hinge mechanism 20 is sandwiched and thereby covered from the surface and back surface thereof by a pair of substantially half-ellipse-shaped cover members 7, 8, and is mounted between the mouthpiece case 2 and the receiver case 10. Hook-shaped locking parts 7a, 8a are formed at the ends on one side in the longitudinal direction in the cover members 7, 8, locking screw fastening holes 7b, 8b are formed at the end parts on the opposite side, the locking parts 7a, 8a in the locked state are passed through the locking screw fastening holes 7b, 8b, and the locking screw fastening holes 7b, 8b are fastened together by the locking screw 9, whereby the cover members 7, 8 are attached. At this time, the locking screw fastening holes 7b, 8b are provided to the half-ellipse-shaped lateral ends in the longitudinal direction, whereby the screw 9 is not exposed from the transmitter case 2 and the receiver case 10 in any of the folded state of the transmitter and receiver cases 2, 10 and a state in which the transmitter and receiver cases 2, 10 are opened to a prescribed angle. Specifically, since the screw 9 cannot be seen from the outside, the aesthetic characteristics can be enhanced.

As shown in FIGS. 7 and 10B, the hinge mechanism in the folded state of the transmitter and receiver cases 2, 10 is in a state in which the first and second frames 21, 41 are substantially parallel. Specifically, among the stopper members 71, 71, the locking tab 71a of the stopper member 71 provided to the fourth connecting part 104 is in contact with the locking protrusion 37b of the fourth joining part 37 of the connecting member 30, and the locking tab 71a of the stopper member 71 provided to the second connecting part 102 is positioned at a slight distance from the locking protrusion 35b of the second joining part 35. Specifically, when the mobile telephone 1 is in the closed state, only one of the locking tabs 71a of the two stopper members 71 makes contact with the locking protrusion 37b. This means that when the opening and closing angle of the transmitter and receiver cases 2, 10 of the mobile telephone 1 is 160°, for example, an angle slightly (e.g., about one to three degrees, i.e., about 0.5 to 1.5° for each rotation shaft) larger than 160° is set for the opening and closing angle restricted by the stopper member 71. By making the angle restricted by the stopper member 71 larger than the actual opening and closing angle, since there is no restriction by the stopper member 71 in the closed state, for example, the transmitter case 2 and the receiver case 10 can be urged by the drive mechanism 50 so as to push against each other. A gap can thereby be prevented from forming between the transmitter and receiver cases 2, 10 in the closed state. A case in which one of the stopper members 71, 71 is in contact was described herein, but a configuration may also be adopted in which a slight gap (0.5 to 1.5°, preferably 1°, about the rotation shaft) is provided between both stopper members. In this case, the cases 2, 10 are supported by coming in contact with each other in the dosed state or the open state of the transmitter and receiver cases 2, 10.

When one case, e.g., the receiver case 10, is subsequently rotated a prescribed angle from the folded state, the other transmitter case 2 also rotates to the same angle in the opposite direction. For example, when the transmitter and receiver cases 2, 10 are opened to 80° as shown in FIGS. 8 and 11A, the first and second frames 21, 41 in the hinge mechanism 20 rotate with respect to the connecting member 30 to substantially the same angle, e.g., 40° each, in opposite directions from each other, as shown in FIG. 11B.

Furthermore, when the transmitter and receiver cases 2, 10 are rotated and opened to the open state of 160°, the first and second frames 21, 41 in the hinge mechanism 20 rotate with respect to the connecting member 30 80° each from each other as shown in FIGS. 9 and 12B. In the 160° open state, the corners 15a, 15b, 16a, 16b of the transmitter and receiver cases 2, 10 come in contact, whereby the open state is maintained, and the stopper members 71, 71 are positioned at a slight gap (2°) with respect to the locking protrusions 35b, 37b. However, it is also apparent that a configuration may be adopted in which such a slight gap is not provided in the open state, the transmitter and receiver cases 2, 10 make contact, and the stopper members 71, 71 also make contact with the locking protrusions 35b, 37b.

Figure 13:
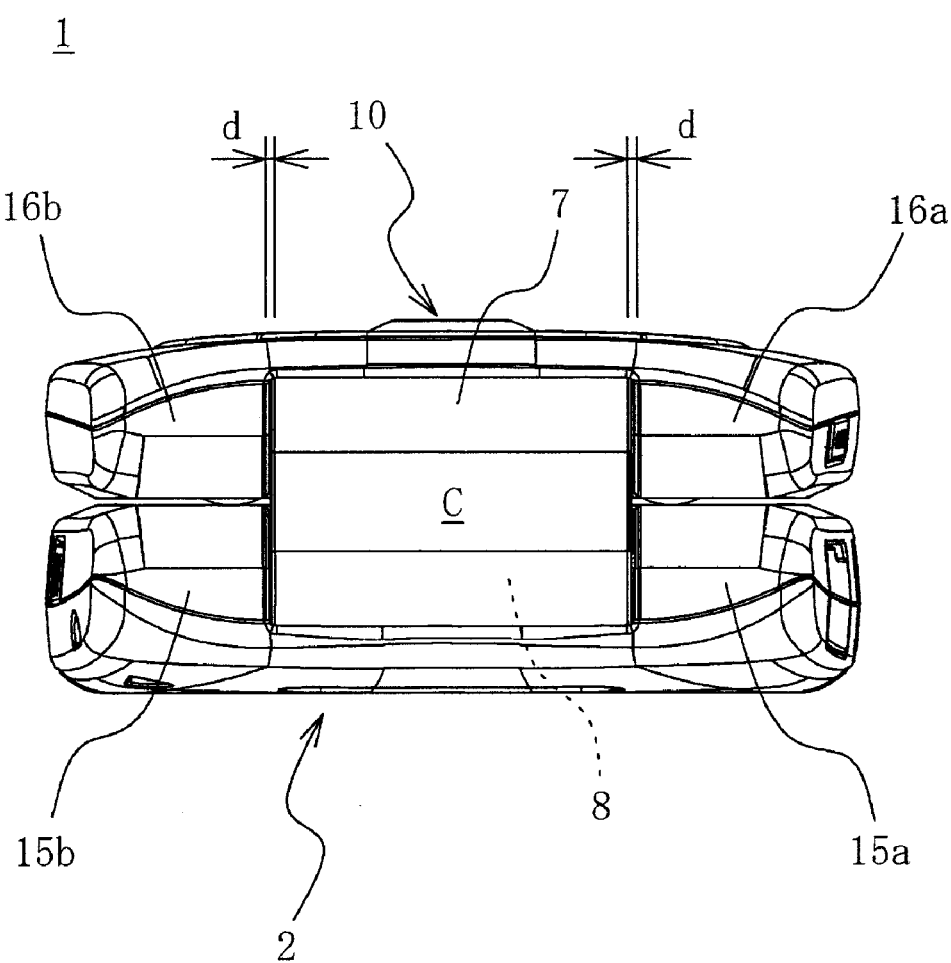
FIG. 13 is a side view from the B direction in FIG. 10.

FIG. 13 is a side view from the B direction of FIG. 10A. As shown in this diagram, when the hinge mechanism 20 is covered by the cover members 7, 8, the length in the width direction of the gap in which the hinge mechanism 20 sandwiched by the corners 15a, 15b and 16a, 16b of the transmitter and receiver cases 2, 10 is connected is greater than the length in the width direction of the cover members 7, 8 that constitute the hinge cover C. Small gaps having a prescribed length d are formed between the lateral ends of the cover members 7, 8 and the corners 15a, 15b and 16a, 16b of the transmitter and receiver cases 2, 10. When gaps are formed in these positions, there is no frictional sound, e.g., creaking sound, of rubbing between the transmitter and receiver cases 2, 10 and the cover members 7, 8 during opening and closing of the transmitter and receiver cases 2, 10. The small gaps are structured so as to prevent contamination by dust and the like.

As described above, since the rotation of the first and second frames 21, 41 is linked in opposite phase with respect to the connecting member 30 by the link mechanism 60 in the hinge mechanism of Example 1, there is no rotation of only one frame, and the rotations of both frames are always linked. A stable opening and closing operation can therefore be obtained, and the transmitter and receiver cases 2, do not become misaligned in the closed state.

In Example 1, the drive mechanism 50 was provided in the two locations of the first and third connecting parts 101, 103, but any number of drive mechanisms may be provided to any of the first through fourth connecting parts 101 through 104. However, since play or rattling occurs due to backlash when only one drive mechanism 50 is provided, one drive mechanism is preferably provided for each rotation shaft. The link mechanism 60 was also provided to the first and third connecting parts 101, 103 to which the drive mechanism 50 was provided, but the link mechanism may be provided to any connecting part insofar as the first frame 21 and the second frame 41 can be linked. The link mechanism is preferably provided so as to link the first arm piece 22 and the third arm piece 42, or the second arm piece 24 and the fourth arm piece 44, because the installation occupies the least amount of space.

The stopper mechanism 70 was also provided to the second and fourth connecting parts 102, 104 in Example 1, but any number of stopper mechanisms may be provided to any of the connecting parts. However, a stopper mechanism is preferably provided for each rotation shaft, in the same manner as the drive mechanism. It is apparent to those skilled in the art that the stopper mechanism 70 may be provided to a connecting part to which the drive mechanism 50 and the link mechanism 60 are also provided.

EXAMPLE 2

Figure 14A:
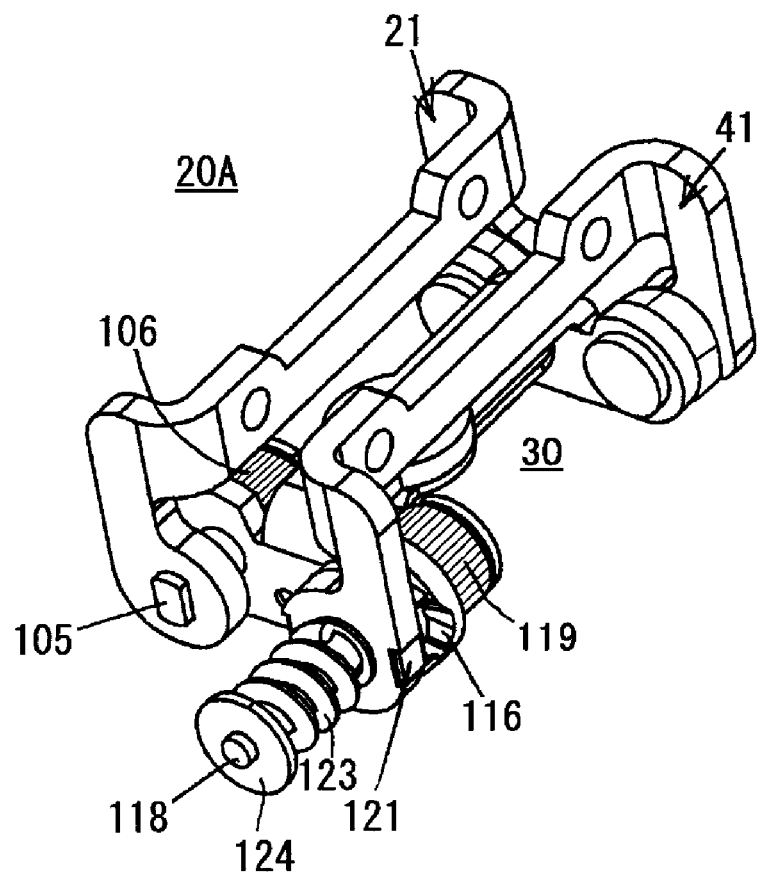
FIG. 14A is a perspective view showing the closed state.
Figure 14B:
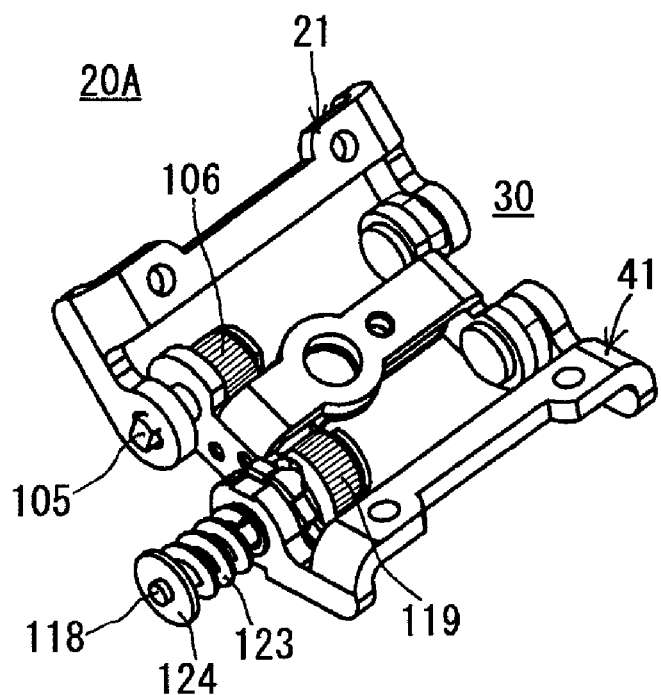
FIG. 14B is a perspective view showing the open state.
Figure 15:
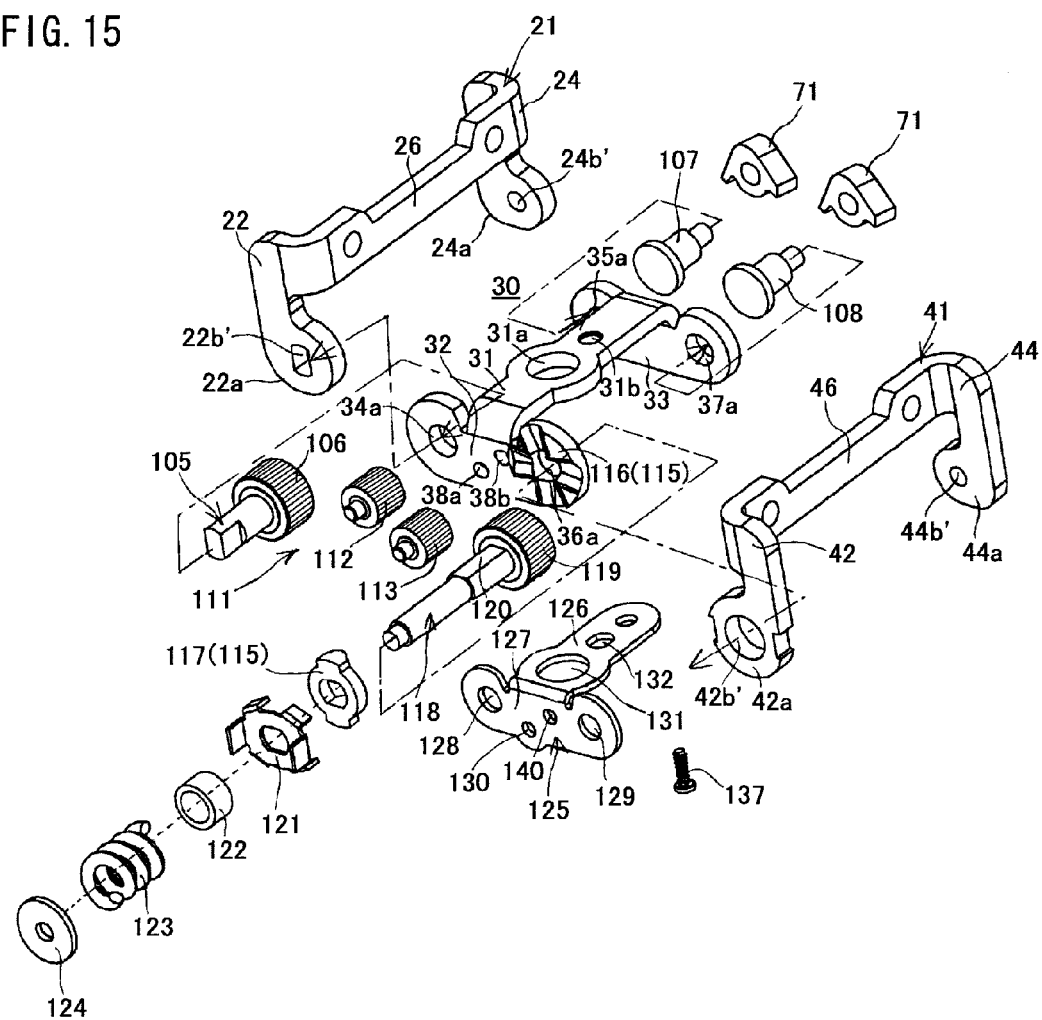
FIG. 15 is an exploded perspective view showing the components of the hinge mechanism shown in FIG. 14.
Figure 16A:
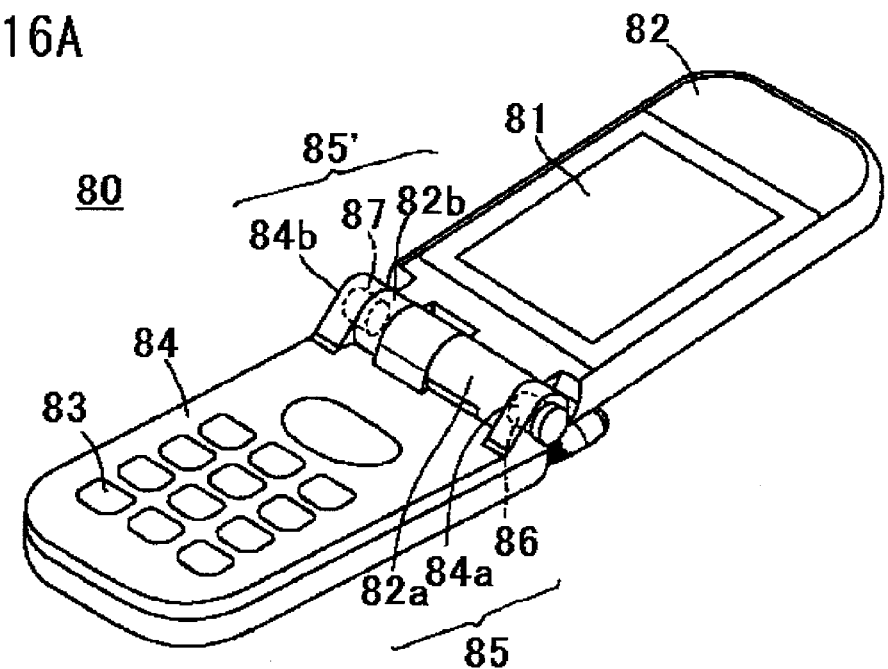
FIG. 16A is a perspective view.
Figure 16B:
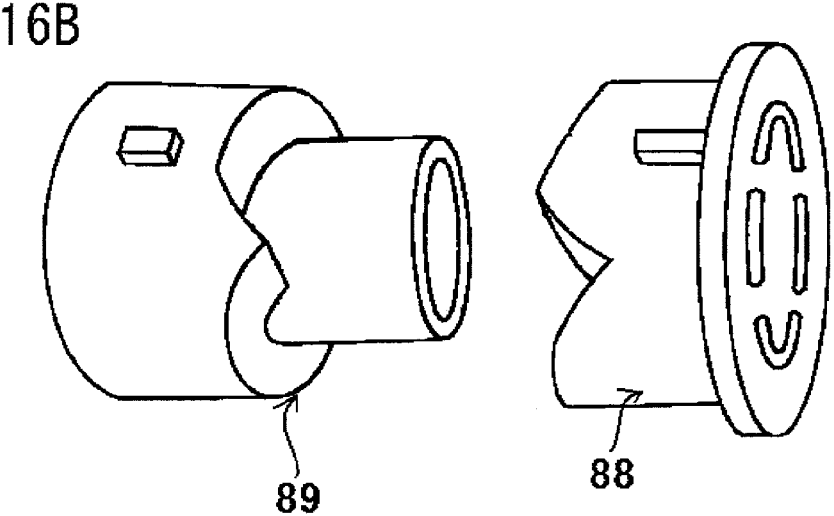
FIG. 16B is a partial enlarged perspective view showing the hinge mechanism.
Figure 17:
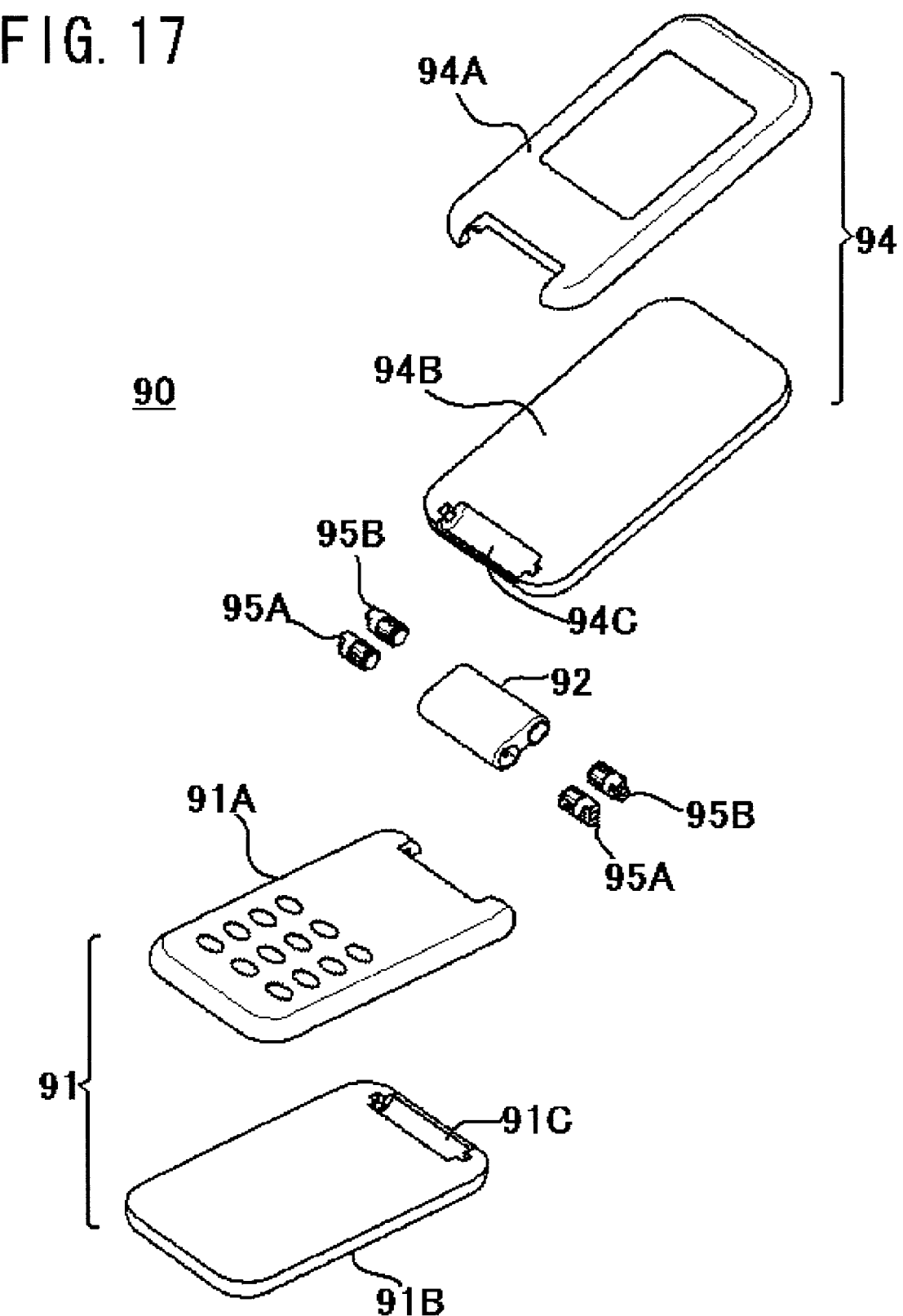
FIG. 17 is an exploded perspective view showing the mobile telephone according to the conventional technique.
Figure 18A:
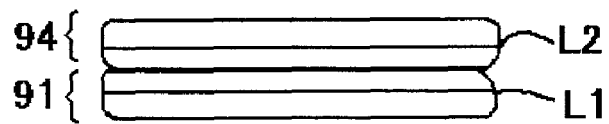
FIG. 18A is a side view showing a state in which the mobile telephone cases are folded.
Figure 18B:
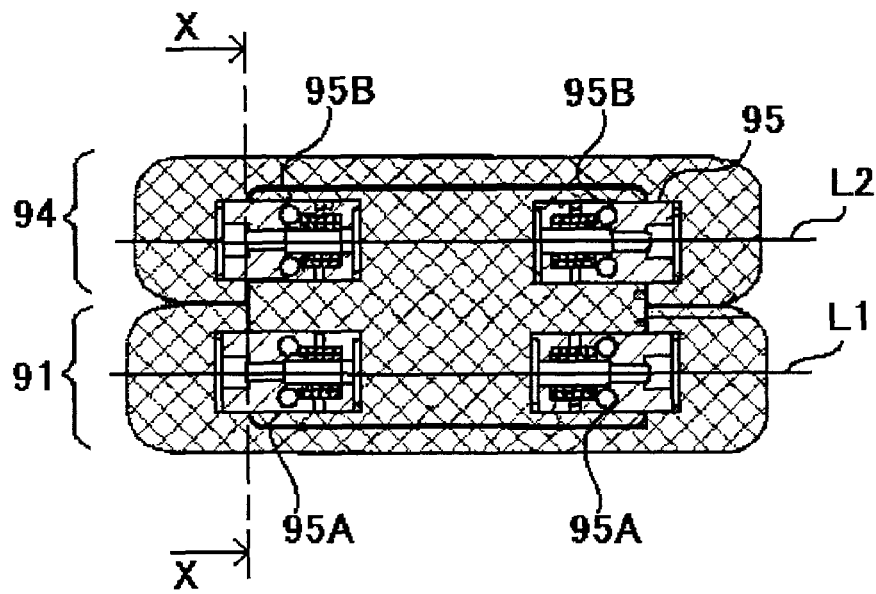
FIG. 18B is an enlarged sectional view showing the portion of the mobile telephone to which the hinge mechanism is provided.
Figure 18C:
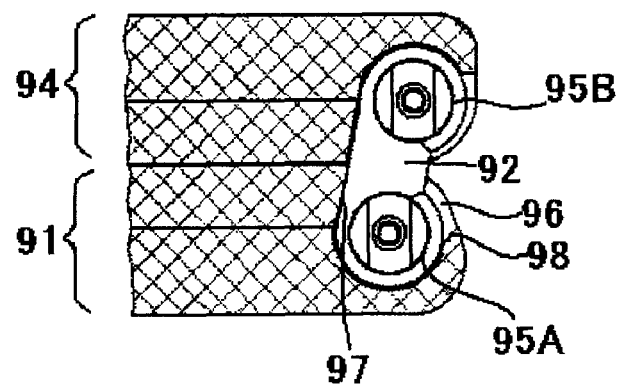
FIG. 18C is a partial enlarged sectional view along line X-X of FIG. 18B.

A case will next be described in which a gear mechanism is used as the linking mechanism for linking the driving of the first and second frames of the link mechanism of the present invention. FIG. 14 is a diagram showing the hinge mechanism according to Example 2 of the present invention, wherein FIG. 14A is a perspective view showing the closed state, and FIG. 14B is a perspective view showing the open state; and FIG. 15 is an exploded perspective view showing the components of the hinge mechanism shown in FIG. 14. Since this hinge mechanism 20A only differs from the hinge mechanism 20 of Example 1 primarily with respect to the configuration of the linking mechanism, and other aspects are substantially the same as in Example 1, the same reference numerals are used for components that are the same as those in Example 1, and the description given hereinafter relates primarily to the components that differ from those of Example 1. In Example 2 described hereinafter, only one drive mechanism is provided. The linking mechanism is described hereinafter as a rotation force transmission mechanism composed of a plurality of gears, and the drive mechanism is described as a rotation angle restricting means.

The hinge mechanism 20A of the present example is composed of the first frame 21, the second frame 41, and the connecting member 30, and the first frame 21 is composed of the pair of left and right first and second arm pieces 22, 24, and the joining piece 26 for connecting the first and second arm pieces 22, 24, as shown in FIG. 15. The first and second arm pieces 22, 24 have joining parts 22a, 24a at the distal ends thereof, a rectangular shaft hole 22b' into which a D-cut part of a first primary shaft 105 is fitted is provided to one joining part 22a, and a round shaft hole 24b' into which the distal end of a first pivot 107 is fitted is provided to the other joining part 24a. According to this configuration, when rotation force is applied to the first frame 21, the rotation force is transmitted to a gear 106 connected to the first primary shaft 105.

The second frame 41 has substantially the same configuration as the first frame 21, and is composed of the pair of left and right third and fourth arm pieces 42, 44, and the joining piece 46 for connecting the third and fourth arm pieces 42, 44. Among the joining parts 42a, 44a provided to the distal ends of the arm pieces 42, 44, a large-diameter shaft hole 42b' through which a second primary shaft 118 is passed, and a concave part in which a coupling 121 is fitted on the external peripheral part are provided to one joining part 42a, and a round shaft hole 44b' in which the distal end of a second pivot 108 is fitted is provided to the other joining part 44a. The coupling 121 retains a cam follower 117 that constitutes the rotation angle restricting means 115, and fixes the cam follower 117 to the second frame 41. The cam follower 117 is non-rotatably joined to the second primary shaft 118. According to this configuration, when a rotation force is applied to the second frame 41, the rotation force is transmitted to the cam follower 117 and a gear 119 that is connected to the second primary shaft 118.

In the connecting member 30, a shaft hole 34a for supporting the first primary shaft 105, a shaft hole 36a for supporting the second primary shaft 118, and shaft holes 38a, 38b for supporting gears 112, 113 are provided to the first connecting piece 32, and a cam surface 116 that constitutes the rotation angle restricting means 115 is integrally etched with the first connecting piece 32 using press machining or the like on the external wall surface that surrounds the shaft hole 36a for supporting the second primary shaft 118. The shaft holes 38a, 38b are arranged in staggered fashion between the shaft hole 34a and the shaft hole 36a. According to this configuration, even when gears 112, 113 having a prescribed external diameter are used, the distance between the shaft hole 34a and the shaft hole 36a can be reduced, and a thin profile can be anticipated in the foldable device in which the hinge mechanism 20A is installed. A shaft hole 35a in which the first pivot 107 is supported, and a shaft hole 37a in which the second pivot 108 is supported are provided to the second connecting piece 33. Unlike the case of Example 1, both ends of the joining piece 31 are connected to the first and second connecting pieces 32, 33, and a screw hole 31b for fixing an auxiliary attachment frame 125, and an opening 31a for attaching the hinge cover C are provided to the joining piece 31 so as to be positioned at the front when installed in the foldable device.

The rotation angle restricting means 115 includes the cam surface 116 and the cam follower 117, and the coupling 121, a sleeve 122, an extension spring 123, and a stop washer 124 are provided to engage the cam follower 117 with the cam surface 116 in elastic fashion, and coordinate the cam follower 117 with the rotation of the second frame 41. In the assembly of these components, the front-side shaft part of the second primary shaft 118 is inserted into the shaft hole 36a of the connecting member 30, and the cam follower 117, the coupling 121, and the sleeve 122 are fitted on this shaft part, after which the distal end of the shaft part is passed through the large-diameter shaft hole 42b' of the second frame 41. After the extension spring 123 is fitted on the distal end of the shaft part, the stop washer 124 is fixed on the end of the second primary shaft 118. Through this configuration, pressure is exerted on the cam follower 117 via the sleeve 122, which can move in the axial direction of the extension spring 123. The inside shaft part of the second primary shaft 118 is fitted in a shaft hole 129 of the auxiliary attachment frame 125.

In the rotation angle restricting means 115 configured as described above, when the first frame 21 and the second frame 41 rotate in relative fashion and open and close, i.e., during the transition from one state to the other state, the load increases at the start of rotation, and decreases once the start of rotation is past, and the rotation angle restricting means 115 functions so as to provide stability between the closed state and the open state. A snap action is thus obtained during opening and closing of the folding mouthpiece and receiver cases 2, 10.

The auxiliary attachment frame 125 supports the gears 106, 112, 113, 119 between the inner surfaces of the first connecting piece 32 of the connecting member 30, and is composed of an upper area 126 and a side area 127. A screw hole 132 through which a fixing screw 137 for fixing the auxiliary attachment frame 125 to the connecting member 30 is passed, and an opening 131 that corresponds to the opening 31a are provided to the upper area 126. A shaft hole 128 for supporting the first primary shaft 105, a shaft hole 129 for supporting the second primary shaft 118, and shaft holes 130, 140 for supporting the gears 112, 113 are provided to the side area 127.

The second connecting piece 33 of the connecting member 30 is supported by the first and second pivots 107, 108 in the joining parts 24b', 44b' of the second and fourth arm pieces 24, 44 of the first frame 21 and the second frame 41, but stopper members 71, 71 are fitted into the first and second pivots 107, 108, respectively. The stopper members 71, 71 have the same shape as described in Example 1, are fixed to the second and fourth arm pieces 24, 44, and come in contact with a locking protrusion (not shown) provided to the external surface of the second connecting piece 33, whereby the rotation of the first and second frames 21, 41 is restricted. In the rotation force transmission mechanism 111, the gears 106, 119 are fixed to the first and second primary shafts 105, 118, respectively, and the gears 112, 113 are free gears that are provided so as to be able to rotate with respect to a central support axis.

In the hinge mechanism 20A thus configured, since the rotation force transmission mechanism 111 composed of an even number of gear trains is provided between the first frame 21 and the second frame 41, when a rotation force is applied to any one of the first frame 21 and second frame 41, the reverse rotation force is transmitted to the other of the first frame 21 and second frame 41. Specifically, when a rotation force is applied to the first frame 21, the first primary shaft 105 rotates, the gear 106 rotates, and the rotation is transmitted to the gear 119 via the gears 112, 113. When the gear 119 rotates, the second primary shaft 118 rotates, the joined cam follower 117 and the coupling 121 rotate, and the second frame 41 with which the coupling 121 is engaged rotates. At this time, the cam follower 117 is elastically engaged with the cam surface 116, and the rotation angle restricting means 115 functions.

FIGS. 14A and 14B show the operation of the hinge mechanism when the second frame 41 is opened from the closed state with respect to the first frame 21. When the first frame 21 and the second frame 41 are opened from the closed state (see FIG. 14A), the open surface is a continuous planar surface (see FIG. 14B). The reason for this is that the first primary shaft 105 of the first frame 21, and the second primary shaft 118 of the second frame 41 are both supported by the connecting member 30. Since the rotation force transmission mechanism 111 connects the gears 112, 113 of both primary shafts through the use of the gears 106, 119, the diameters of the gears 106, 119 of both primary shafts can be reduced.

As described above, according to the hinge mechanism 20A of Example 2 of the present invention, an even number of gears are used as the linking mechanism to coordinate the rotation of the first and second frames 21, 41. Therefore, when the mouthpiece case 2 or receiver case 10 connected to one frame of the foldable device (e.g., the mobile telephone 1 shown in FIGS. 1 through 3) provided with the hinge mechanism 20A is rotated to place the foldable device in the open state, the hinge mechanism rotates to an angle obtained by equally dividing the rotation angles of the mouthpiece and receiver cases 2, 10 about two shafts, and the shafts do not rotate independently. Displacement of the mouthpiece and receiver cases 2, 10 in the closed state can therefore be prevented.

In Example 2 described above, a single drive mechanism was provided, but it is apparent from the configuration of Example 1 that two or more drive mechanisms may also be provided.

The invention claimed is:

1. A hinge mechanism of a foldable device for foldably connecting one-end parts of a pair of device cases to each other, said hinge mechanism comprising:
   a first frame provided with a joining piece comprising a plate-shaped body having a prescribed length that is attached to one of said device cases, first and second arm pieces that stand in the same direction from both end parts of said joining piece, and joining parts formed at distal end parts of the first and second arm pieces;
   a second frame provided with a joining piece comprising a plate-shaped body having a prescribed length that is attached to another of said device cases, third and fourth arm pieces that stand in the same direction from both end parts of said joining piece, and joining parts formed at distal end parts of the third and fourth arm pieces; and
   a third frame provided with a joining piece comprising a plate-shaped body having a prescribed length, and first and second connecting pieces that stand in the same direction from both end parts of said joining piece, are branched to the left and right, and that have first through fourth joining parts connected to said first through fourth arm pieces at said branched distal end parts;
   wherein the joining parts arm formed in said first through fourth arm pieces, and said first through fourth joining parts are pivotally connected;
   wherein first through fourth connecting parts are formed, and a drive mechanism for rotating/retaining said first and second frames in a prescribed position is provided to at least one of said first through fourth connecting parts; and
   wherein a connection is formed by a linking mechanism between at least one combination of connecting parts of said first or second connecting part and said third or fourth connecting part, and when said first frame is rotated a prescribed angle in one direction in relation to said third frame about said first and second connecting parts as an axis, said linking mechanism links the rotation so that said second frame rotates the same angle as said first frame in the opposite direction with respect to said third frame about said third and fourth connecting parts as an axis.

2. The hinge mechanism of a foldable device according to claim 1, wherein said drive mechanism is provided to said first connection part and third connection part that are opposite each other, to said second connection part and fourth connection part that are opposite each other, or to all of said first through fourth connection parts.

3. The hinge mechanism of a foldable device according to claim 1, wherein a stopper mechanism for restricting said first and second frames in an open state and a closed state is provided to at least one of said first through fourth connection parts.

4. The hinge mechanism of a foldable device according to claim 3, wherein said stopper mechanism is provided to one of said first and second connection parts that connect said first frame, and to one of said third and fourth connection parts that connect said second frame.

5. The hinge mechanism of a foldable device according to claim 4, wherein said drive mechanism is provided to a connection part to which said stopper mechanism is not provided.

6. The hinge mechanism of a foldable device according to claim 3, wherein said stopper mechanism comprises:
   a stopper member that is a circular plate body having an external diameter smaller than an external diameter of said joining part, and that is fixed to one surface of a joining part of an arm piece or connecting piece that constitutes a connection part to which said stopper mechanism is provided, wherein the stopper member is provided with a pair of locking tabs that protrude in a normal line direction from two locations of an external peripheral edge of said plate body; and
   a locking protrusion for preventing rotation of said stopper member by coming in contact with any of said locking protrusions, provided to one surface of a joining part of the arm piece or connecting piece to which said stopper member is not fixed.

7. The hinge mechanism of a foldable device according to claim 6, wherein said stopper member is composed of a metal rigid body.

8. The hinge mechanism of a foldable device according to claim 1, wherein said drive mechanism comprises:
   arm-piece-side cam pieces provided to one surface of at least one of said first through fourth arm pieces;
   connection-piece-side cam pieces provided to one surface that comes in contact with said arm-piece-side cam pieces of the connection piece connected to the arm piece to which said arm-piece-side cam pieces are provided; and
   a spring body for pushing said arm piece or connection piece to strengthen meshing of said arm-piece-side cam pieces with the connection-piece-side cam pieces.

9. The hinge mechanism of a foldable device according to claim 8, wherein said arm-piece-side cam pieces and connection-piece-side cam pieces are provided so that a plurality of protruding cams provided in radial fashion about a rotational axis mesh together, and so that an angle formed by any two of said plurality of cams is the same angle as an angle to which said first or second frame can rotate.

10. The hinge mechanism of a foldable device according to claim 8, wherein said arm-piece-side cam pieces or connection-piece-side cam pieces are integrally formed on one surface of said arm piece or connection piece.

11. The hinge mechanism of a foldable device according to claim 1, wherein said linking mechanism is provided between at least one pair of connection parts that face each other via said third frame among said first through fourth connection parts.

12. The hinge mechanism of a foldable device according to claim 1, wherein said first through third frames are composed of metal rigid bodies.

13. The hinge mechanism of a foldable device according to claim 1, wherein said linking mechanism is a link mechanism comprising:
an actuation bar in which a center part is pivotally fixed between said first or second connection part and said third or fourth connection part; and
a pair of cam bridge pieces fixed to a rotation shaft of said first or second arm piece and said third or fourth arm piece, wherein one end part and the other end part of said actuation bar are fixed in a position at a prescribed distance from said rotation shaft.

14. The hinge mechanism of a foldable device according to claim 1, wherein said linking mechanism is a gear mechanism comprising:
gears fixed to each of said first or second arm piece and said third or fourth arm piece; and
an even number of free gears attached between said gears.

15. A foldable device, comprising:
a pair of device cases and an end part on one side of each of said pair of device cases is connected to the other by the hinge mechanism according to claim 1.

16. The foldable device according to claim 15,
wherein surfaces of said pair of device cases come in contact with each other, and a prescribed gap is formed between said locking protrusion and one of the locking tabs of said stopper member when said foldable device is placed in a closed state; and
wherein end parts on one side that are connected by said hinge mechanism of said pair of device cases come in contact with each other, and a prescribed gap is formed between said locking protrusion and the other locking tab of said stopper member when said foldable device is placed in an open state.

17. The foldable device according to claim 16, wherein said prescribed gap is a gap that corresponds to 0.5 to 1.5° about a rotation axis of said stopper member.

18. The foldable device according to claim 15, wherein
wherein at least a control circuit board is provided inside said pair of device cases, both corners of an end part on one side to which the hinge mechanism of the pair of device cases is connected protrude a prescribed length in a direction orthogonal to said end part on one side, and said hinge mechanism is attached between said protruding corners of said pair of device cases;
wherein said foldable device is further provided with connection wiring for electrically connecting said pair of device cases with each other and transmitting various types of control signals and the like; and
wherein said connection wiring is wired in curving fashion along said hinge mechanism and corners of one of said pair of device cases, and both ends of the connection wiring are connected to the control circuit boards inside said pair of device cases.

19. The foldable device according to claim 18,
wherein said hinge mechanism is composed of a first rotation shaft composed of said first and second connection parts that is positioned between said corners of one of said device cases, and a second rotation shaft composed of said third and fourth connection parts that is positioned between said corners of the other of said device cases; and
wherein said connection wiring is provided with first through fourth curves and passes from one of said device cases through one corner of the device case, leads toward said hinge mechanism along said first rotation shaft via said first curve, extends toward said second rotation shaft from said first rotation shaft via said second curve, leads toward one corner of the other of said device cases along said second rotation shaft via said third curve, and is wired to the other of said device cases via said fourth curve.

20. The foldable device according to claim 18, wherein said connection wiring is wired so as to pass through adjacent corners on one side among the corners of said pair of device cases.

21. The foldable device according to claim 18, wherein said connection wiring is a flexible printed wiring board.

22. The foldable device according to claim 21, wherein said flexible printed wiring board is composed of an elongated film-shaped body provided at both ends with terminal pieces that are connected to connecting parts provided to said control circuit boards, and a middle part in a longitudinal direction is bended in substantially a horseshoe shape.

23. The foldable device according to claim 22, wherein two areas extending in a direction orthogonal to a longitudinal direction of said flexible printed wiring board are wired along the first and second rotation shafts of said hinge mechanism.

24. The foldable device according to claim 22, wherein respective areas extending in a direction parallel to the longitudinal direction of said flexible printed wiring board are wound at a prescribed angle around said first and second rotation shafts in a position adjacent to said bended portions, which bend in a horseshoe shape.

25. The foldable device according to claim 22, wherein said bended portions that bend in a horseshoe shape are curved in an arc.

26. The foldable device according to claim 21, wherein a plurality of said flexible printed wiring boards is overlapped and wired.

27. The foldable device according to claim 18, wherein said connection wiring is a coaxial cable having a prescribed diameter.

28. The foldable device according to claim 27, wherein said coaxial cable is composed of a flexible cable-shaped body provided at both ends with terminal pieces that are connected to connecting parts provided to said control circuit boards, and said coaxial cable is wired so as to pass through communicating holes formed along an axis of said first and second rotation shafts.

* * * * *